(12) United States Patent
Steiner

(10) Patent No.: US 9,463,922 B2
(45) Date of Patent: Oct. 11, 2016

(54) CARGO SHIPPING CONTAINER WITH TOP-ACCESS ROOF COVER

(71) Applicant: Gerald M Steiner, Pahrump, NV (US)

(72) Inventor: Gerald M Steiner, Pahrump, NV (US)

( * ) Notice: Subject to any disclaimer, the term of this patent is extended or adjusted under 35 U.S.C. 154(b) by 0 days.

(21) Appl. No.: 14/886,515

(22) Filed: Oct. 19, 2015

(65) Prior Publication Data
US 2016/0137404 A1   May 19, 2016

Related U.S. Application Data

(60) Provisional application No. 62/079,411, filed on Nov. 13, 2014.

(51) Int. Cl.
| | |
|---|---|
| *B65D 88/00* | (2006.01) |
| *B65D 90/58* | (2006.01) |
| *B65D 88/12* | (2006.01) |
| *B60P 1/28* | (2006.01) |
| *B61D 9/00* | (2006.01) |
| *B65D 90/00* | (2006.01) |

(52) U.S. Cl.
CPC ............. *B65D 88/126* (2013.01); *B60P 1/28* (2013.01); *B61D 9/00* (2013.01); *B65D 90/0086* (2013.01)

(58) Field of Classification Search
CPC .... B65D 43/20; B65D 43/24; B65D 88/126; B65D 90/0086; B65F 1/1646; B60P 1/28; B61D 9/00
USPC .................................. 220/1.5, 811, 831, 832
See application file for complete search history.

(56) References Cited

U.S. PATENT DOCUMENTS

| | | | | |
|---|---|---|---|---|
| 1,699,904 | A * | 1/1929 | Miller | A47B 63/02 206/425 |
| 2,074,668 | A * | 3/1937 | Rabaut | B65D 43/24 217/59 |
| 3,061,134 | A | 11/1960 | Fesmire et al. | |
| 4,345,697 | A * | 8/1982 | Wilson | H02B 1/066 16/260 |
| 5,884,794 | A * | 3/1999 | Calhoun | B65D 88/121 105/355 |
| 6,296,132 | B1 | 10/2001 | Pickler | |
| 7,789,256 | B2 | 9/2010 | Petzitillo, Jr. et al. | |
| 2006/0043090 | A1* | 3/2006 | Ferrini | B65D 88/522 220/6 |
| 2010/0264137 | A1* | 10/2010 | Lampe | B29C 41/06 220/1.5 |
| 2014/0231422 | A1* | 8/2014 | Kochanowski | B65D 90/008 220/1.5 |
| 2015/0239622 | A1* | 8/2015 | Jian | B65D 43/20 220/813 |

* cited by examiner

*Primary Examiner* — J. Gregory Pickett
*Assistant Examiner* — Niki M Eloshway
(74) *Attorney, Agent, or Firm* — Connie R. Masters

(57) ABSTRACT

An intermodal transport container comprising a rectangular frame having enclosed sides, a floor, a top-access roof cover including a retractable roof panel assembly, a first end closure, and an opposing end closure collectively forming an enclosed interior volume for transporting bulk material. The top-access hinged roof cover includes a robust roof panel hinge system that engages with the roof panel assembly. The roof panel opens in accordance with a two stage process: initially having a linear motion where a member of the roof panel hinge system engages with a support beam of the roof panel assembly and a second stage where the roof panel rotates in accordance with the pivotal motion of the hinge of the roof panel hinge system.

15 Claims, 16 Drawing Sheets

CARGO SHIPPING CONTAINER WITH TOP-ACCESS ROOF COVER

CROSS-REFERENCE TO RELATED APPLICATIONS

This nonprovisional application claims the benefit of U.S. Provisional Patent Application Ser. No. 62/079,411, filed on Nov. 13, 2014, which is incorporated herein in its entirety.

FIELD OF THE INVENTION

The present invention relates to a cargo shipping container having a roof cover with improved top access, and more particularly to a cargo shipping container having a roof hinge system enabling the refraction of a roof panel assembly.

BACKGROUND OF THE INVENTION

Transport of materials and goods is a vital process for commerce. This transport requires efficiency to minimize impacts on manpower, time and costs. One commonly employed solution for long distance shipping is the use of intermodal cargo containers. Intermodal cargo containers are fabricated based upon standardized shapes, size and other criteria such as standardized handling devices (including standardized grips, hooks, tie downs and the like) that enable shippers, handlers, stevedores, longshoreman, truckers and others to handle numerous containers quickly and generally independent of the actual contents of the containers.

Intermodal cargo containers are normally built to standardized specifications issued by various authorities. Standardization makes it possible to efficiently handle containers sent to and from various countries throughout the world. Perhaps the foremost authority for issuance of such standards is the International Standards Organization (ISO), which issues numbered standards directives. For example, "ISO 1496/IV" defines one standard for cargo containers, "ISO 1161" defines another standard for the corner locks of such containers, and the like.

These standards relate primarily to the dimensions of the containers, but also set forth parameters for protection from the elements (including weather, ocean spray, temperature, and the like), strength, and other functional criteria. The standards have been used to facilitate the shipping of goods throughout the world by a wide variety of transportation methods and the handling of the containers for the shipped goods by mechanical equipment, regardless of location or manufacturer of the container or equipment.

Utilization of standards also permits cargo to be transferred between various transportation forms without requiring the lengthy process of unloading and re-loading the container itself or reconfiguring the transportation form to suit the shipping container. For example, a container filled with cargo may be off-loaded from a ship by an overhead crane and loaded directly onto a trailer of a truck or rail car of a train for continued transport to its destination.

It is known in the art to use tank containers for shipping liquid bulk goods, open-top bulktainers for heavy bulk minerals and machinery, hopper cars (both open-top and covered-top) for shipping bulk commodities, and standardized reusable steel box-type intermodal containers for transporting boxes, cartons, cases, pallets, drums, etc. It is also known in the art to provide dry bulk container liners for the standardized intermodal containers to allow shipping of bulk materials. Though these conventional means have achieved a degree of success, problems remain in the transport of bulk materials.

Using an open-top container for shipping bulk materials has disadvantages, such as exposure to the elements and a significant loss of the transported material. Often the open-top container is covered with a canvas top to prevent product loss; the canvas is easy to attach, but provides no structural support, provides limited protection, and quickly deteriorates, necessitating replacement.

Using a liner allows the conversion of the standardized intermodal shipping container to a bulk-material carrier. The liner to be placed within the container is generally formed of woven fabric or blown films of polyethylene or polypropylene and manufactured to conform to the size of the intermodal shipping container. But there is difficulty in introducing and removing the bulk material because the only access is through the rear walk-door of the shipping container. Because the bulk material is pumped into the liner from a fitting at the rear door, the material is difficult to distribute evenly throughout the container. Emptying the product from the liner is also troublesome.

It would be desirable to provide a roof cover with improved top access to the interior of the standardized intermodal shipping container for convenient transport of dry bulk goods without negatively impacting the universal capabilities and adaptability of the container. Additionally, the roof cover should be robust and long-lasting, should prevent product loss, should provide structural support and protection, and should allow even distribution of product within the container.

Accordingly, there remains a need in the art for a standardized intermodal cargo shipping container with a strong, substantial roof cover that provides convenient top access for the introduction of goods into the shipping container for containment, storage and transport of dry bulk goods, heavy machinery, packaged or crated goods, and the like.

SUMMARY OF THE INVENTION

The present invention overcomes the deficiencies of the known art and the problems that remain unsolved by providing a shipping container roof cover with improved access to the interior of the container, while maintaining the standardized dimensions and configuration of the intermodal shipping container. Presented herein is an intermodal container including an intermodal container frame, a pair of sidewall panels, flooring, a first end closure on one end of the container, an opposing second end closure on the opposite end of the container, a roof panel assembly, and a roof hinge system. When opening the top of the shipping container, the roof panel assembly is moved from the horizontal closed position, pivoted, and positioned vertically against the exterior side of the shipping container by engagement with the roof hinge system. This allows full access to the top of the shipping container. The intermodal container frame comprises a first end frame (first end corner posts, first top-end frame rail, and first bottom-end frame rail), a second end frame (second end corner posts, second top-end frame rail, and second bottom-end frame rail), a first upper side rail, a second upper side rail, a first bottom side rail, and a second bottom side rail. The first end closure may be a cargo-access walk-type door, a closed end panel, and/or a dump-gate door. The second end closure may also be a cargo-access walk-type door, a closed end panel, and/or a dump-gate door.

In accordance with one embodiment of the present invention, the top-access roof cover can be used on a shipping container having a dump-gate door as the first end closure and an end panel as the second end closure. The container of this embodiment can be used to transport dry bulk goods, such as coal, agricultural products, minerals, fertilizers, raw mined materials, concrete, aggregates, rock, stone, dirt, wood, and the like.

In another embodiment of the present invention, the top-access roof cover can be used on a shipping container having both a dump-gate door and a cargo-access walk-type door as the first and second end closures. This allows for dual usage of the intermodal container. The container can be loaded through the rear cargo-access door with a palletized shipment (such as boxes, cartons, cases, sacks, drums, etc.). After transport and delivery of that shipment, the empty container can then be turned front to back to position the dump-gate door rearward. This converts the standard packaged-goods shipping container to a bulk materials dump container. The top access can then be utilized to load the shipping container with bulk materials through the top-access roof cover of the present invention. The dump-gate door is then used to remove the bulk material from the container.

In another embodiment of the present invention, the top-access roof cover can be used on a shipping container having two end panels. In this embodiment, the roof cover is opened and cargo is loaded (such as by a crane) into the interior of the container through the top access. After transport, the roof cover is opened and the cargo is unloaded through the top access.

Various elements of the invention may be used alone or in combination. Numerous aspects of the present invention are herein presented.

In one aspect, the roof panel assembly comprises a plurality of rolling elements for aiding in a horizontal sliding motion of the roof panel.

In a second aspect, the support railing of the intermodal container frame further comprises a plurality of rolling elements for aiding in a horizontal sliding motion of the roof panel.

In yet another aspect, each of the roof panel assembly and the support railing of the intermodal container frame further comprises a plurality of rolling elements for aiding in a horizontal sliding motion of the roof panel.

In yet another aspect, the roof panel assembly further comprises a pair of rolling elements for aiding in a horizontal sliding motion of the roof panel, each rolling element being located proximate a distal or free end thereof and the support railing of the intermodal container frame further comprises a pair of rolling elements for aiding in a horizontal sliding motion of the roof panel, each rolling element being located proximate a proximal or hinged end thereof.

In yet another aspect, the hinge comprises a hinge pin and the hinge is integrated to the intermodal container locating the hinge pin internal to or within the container interior volume.

In yet another aspect, the hinge comprises a hinge pin and the hinge is integrated to the intermodal container locating the hinge pin external of the container interior volume.

In yet another aspect, a single cargo-access door is pivotally assembled to one of the rear end corner posts, wherein the door rotates about a vertical axis.

In yet another aspect, dual cargo-access doors are pivotally assembled to each of the pair of rear end corner posts, wherein each door rotates about a vertical axis.

In yet another aspect, the intermodal container further comprises a single cargo-access door and a dump-gate door, wherein the cargo-access door is pivotally assembled to one of the rear end corner posts, wherein the cargo-access door rotates about a vertical axis and the dump-gate door is pivotally assembled to the top front end frame rail, wherein the dump-gate door rotates about a horizontal axis.

In yet another aspect, an upper edge of the dump-gate door is pivotally assembled to the top rear end frame rail, wherein the door rotates about a horizontal axis.

In yet another aspect, the intermodal container further comprises a roof panel guide slot formed within each top-end frame rail and the roof panel further comprises a roof panel movement guide element, wherein the roof panel movement guide element slidably engages with the roof panel guide slot during operation.

In yet another aspect, the roof panel guide slot further comprises an upper horizontal flange and a lower support surface for vertically retaining the roof panel movement guide element during a horizontally sliding motion.

In yet another aspect, the roof panel hinge-engaging beam further comprises a spacing segment, wherein the spacing segment defines a roof panel portion of the roof panel rail-engaging channel.

In yet another aspect, a proximal end of the spacing segment of the roof panel hinge-engaging beam engages with the top surface of the respective side rail when the roof panel is oriented in an opened configuration providing vertical support to the roof panel.

In yet another aspect, the intermodal container frame further comprises at least one roof panel roller support beam centrally located between each end-located roof panel roller support beam.

In yet another aspect, each of the at least one centrally located roof panel roller support beams further comprises a rolling element, the rolling element preferably located proximate the proximal or hinge end thereof.

In yet another aspect, the roof panel hinge-engaging beam is segmented providing clearance for each of the at least one centrally located roof panel roller support beams.

In yet another aspect, the intermodal container further comprises a roof panel wheel chock slot formed within each roof panel roller support beam for receiving and retaining a respective roof panel edge wheel.

In yet another aspect, the intermodal container further comprises a roof panel support wheel chock slot formed within the roof panel for receiving and retaining a respective roof panel support wheel.

In yet another aspect, the intermodal container further comprises an element that retains the hinge pivotal engagement rail in horizontal registration with the roof panel rail-engaging channel until the hinge pivotal engagement rail is seated within the roof panel rail-engaging channel.

In yet another aspect, the intermodal container further comprises a latching and locking system for securing the cargo-access door and/or the dump-gate door in a closed configuration.

In yet another aspect, the intermodal container further comprises a latching and locking system for securing the roof panel in a closed configuration.

In yet another aspect, the roof panel is supported by an upper surface of the top curb-side rail when the roof panel rotated into a closed configuration, wherein the top curb-side rail is located opposite of the roof panel edge.

In yet another aspect, a first roof panel roller support beam is attached to the front top-end rail and a second roof panel roller support beam is attached to the rear top-end rail.

In yet another aspect, the roof panel hinge-engaging beam is arranged being parallel to a longitudinal axis of the roof panel.

In yet another aspect, the roof panel structural supporting member is at least one beam extending along a lateral axis of the roof panel.

In yet another aspect, the cargo-access door comprises a pair of doors, each door being pivotally attached to a respective end corner post of the pair of end corner posts.

In yet another aspect, the intermodal container further comprises a series of spatially arranged fasteners employed for securing the roof panel assembly in a closed configuration. The spatially arranged fasteners can be a threaded fastener inserted through a securing aperture. The threaded fasteners would be inserted through securing apertures located at each end of the roof panel assembly and spatially arranged at pre-determined distances along the top curb-side rail.

In yet another aspect, additional access can be provided by including a door or other passageway through the one of the sidewall panels 140.

Other aspects are provided, including various rolling elements for aiding in the horizontal sliding motion of the roof panel and including variations in placement of the hinge pin.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
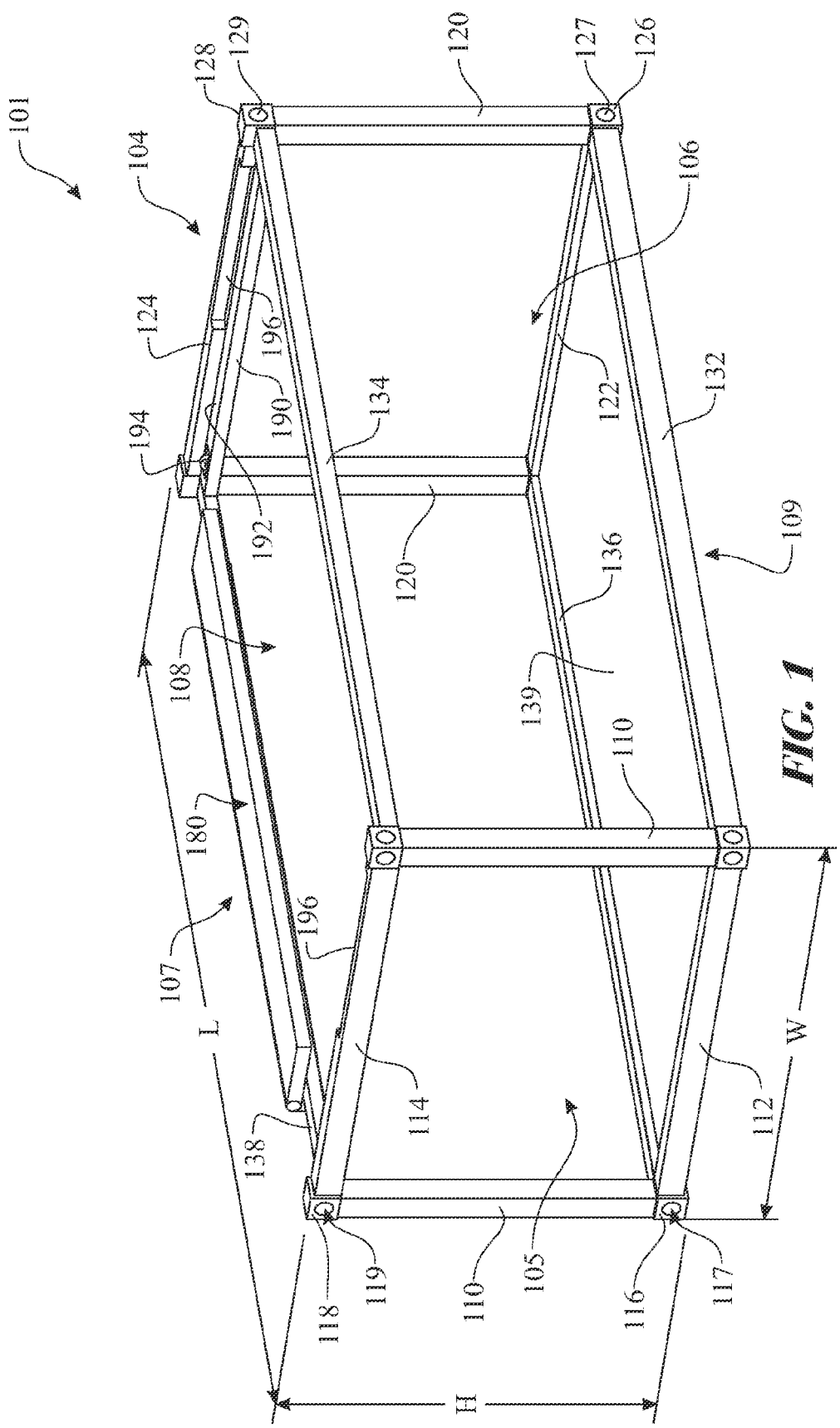
FIG. 1 presents an isometric view of an exemplary intermodal container frame.
Figure 2:
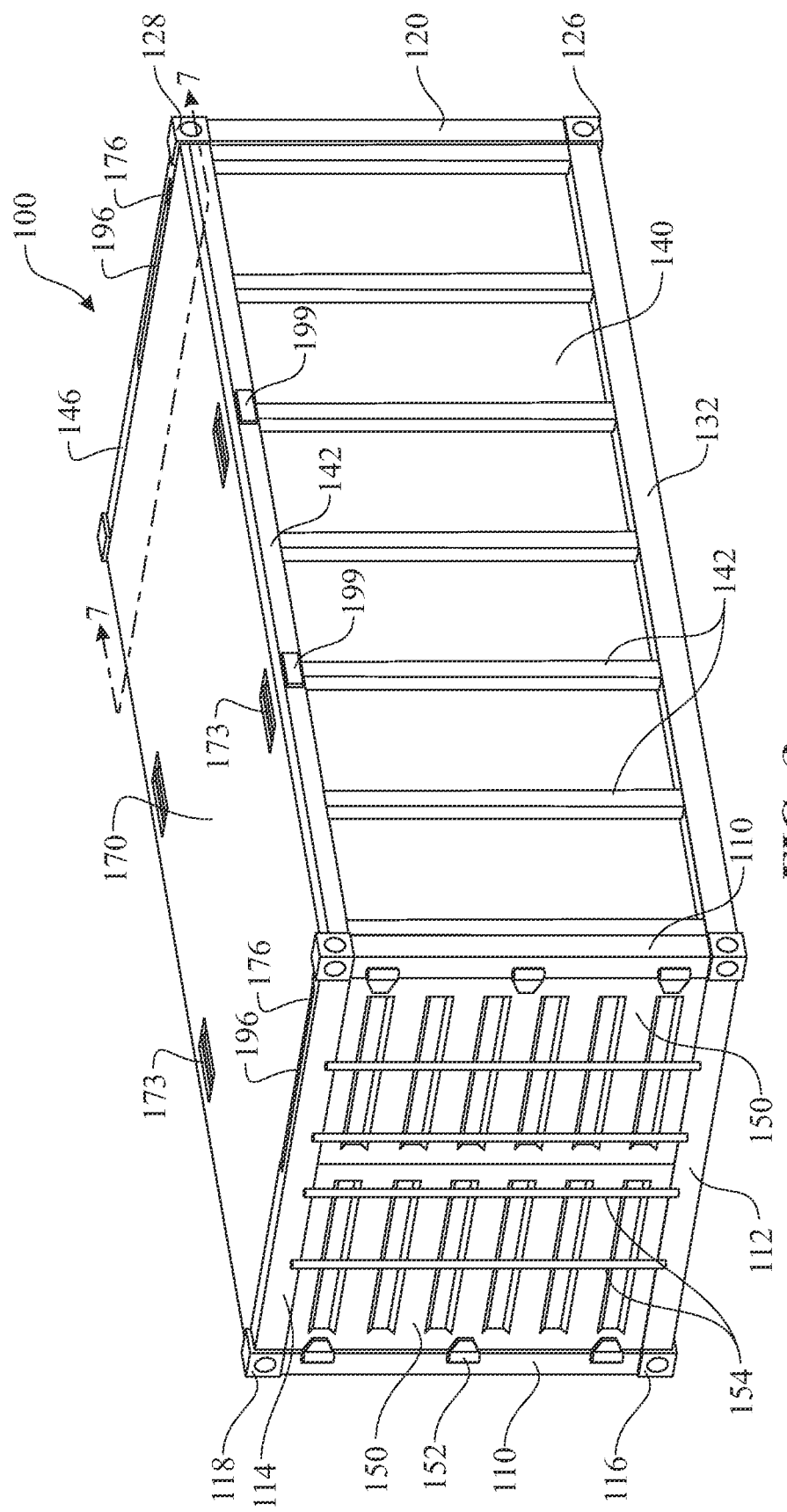
FIG. 2 presents an isometric view of an exemplary intermodal shipping container based upon the intermodal container frame introduced in FIG. 1, wherein the shipping container is shown in an enclosed shipping configuration.
Figure 3:
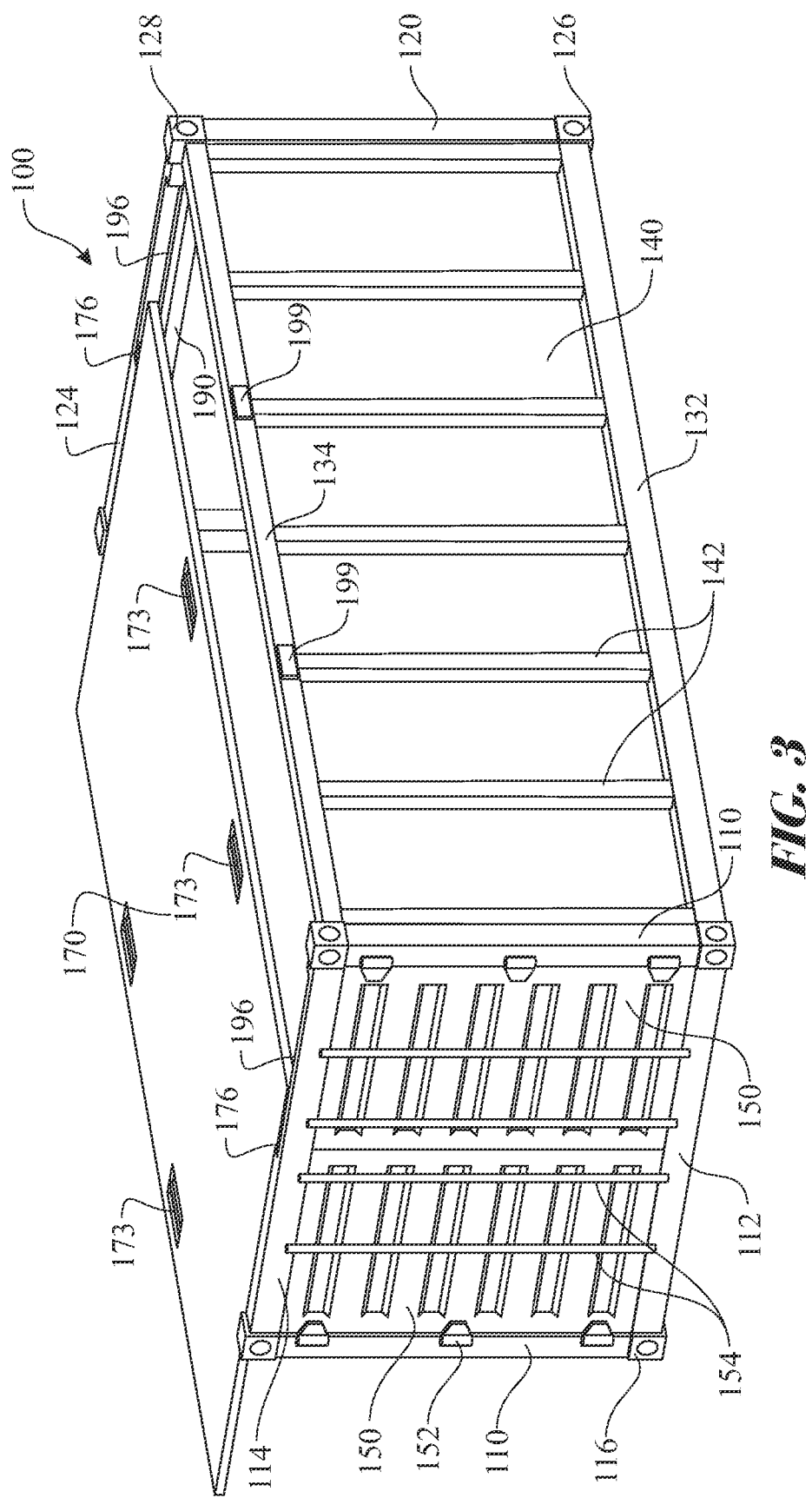
FIG. 3 presents an isometric view of the intermodal shipping container, wherein the shipping container is illustrated having the roof panel located at a first position of a series of roof panel opening phases, wherein the first position engages a hinge pivotal engagement rail within a roof panel rail-engaging channel.
Figure 4:
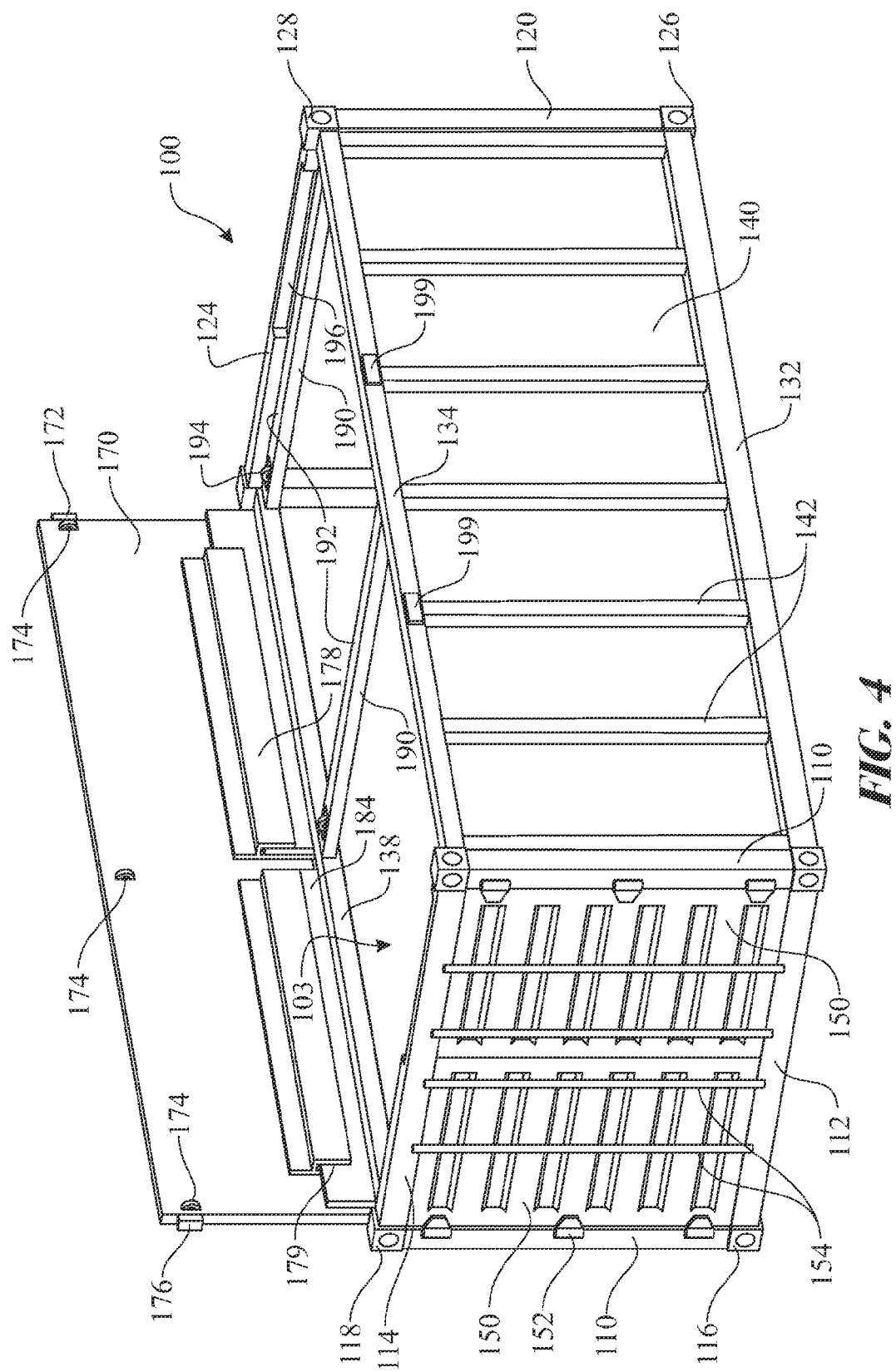
FIG. 4 presents an isometric view of the intermodal shipping container, wherein the shipping container is illustrated having the roof panel located at a second position of the series of roof panel opening phases, wherein the second position vertically orients the roof panel.

An intermodal shipping container 100 with a top-access roof cover is illustrated in various configurations in the figures. Vertical loading capability is provided by the roof cover that includes a roof hinge system 180 (FIG. 1) attached to an upper section of an intermodal container frame 101 that enables retraction of a roof panel assembly 170. When the roof panel assembly 170 is in the horizontal closed position, the contents of the shipping container are securely protected. To allow free access to the entire top portion of the shipping container, the roof panel assembly 170 is slid from the horizontal closed position (as shown in FIGS. 2 and 3), is pivoted, and is positioned vertically against the exterior side of the shipping container (as shown in FIG. 4) by engagement with the roof panel hinge system 180. The roof panel hinge system 180 runs substantially the length of the container, providing a supportive, robust, long-lasting pivot that can withstand the rigors of mechanized opening and closing.

Figure 5:
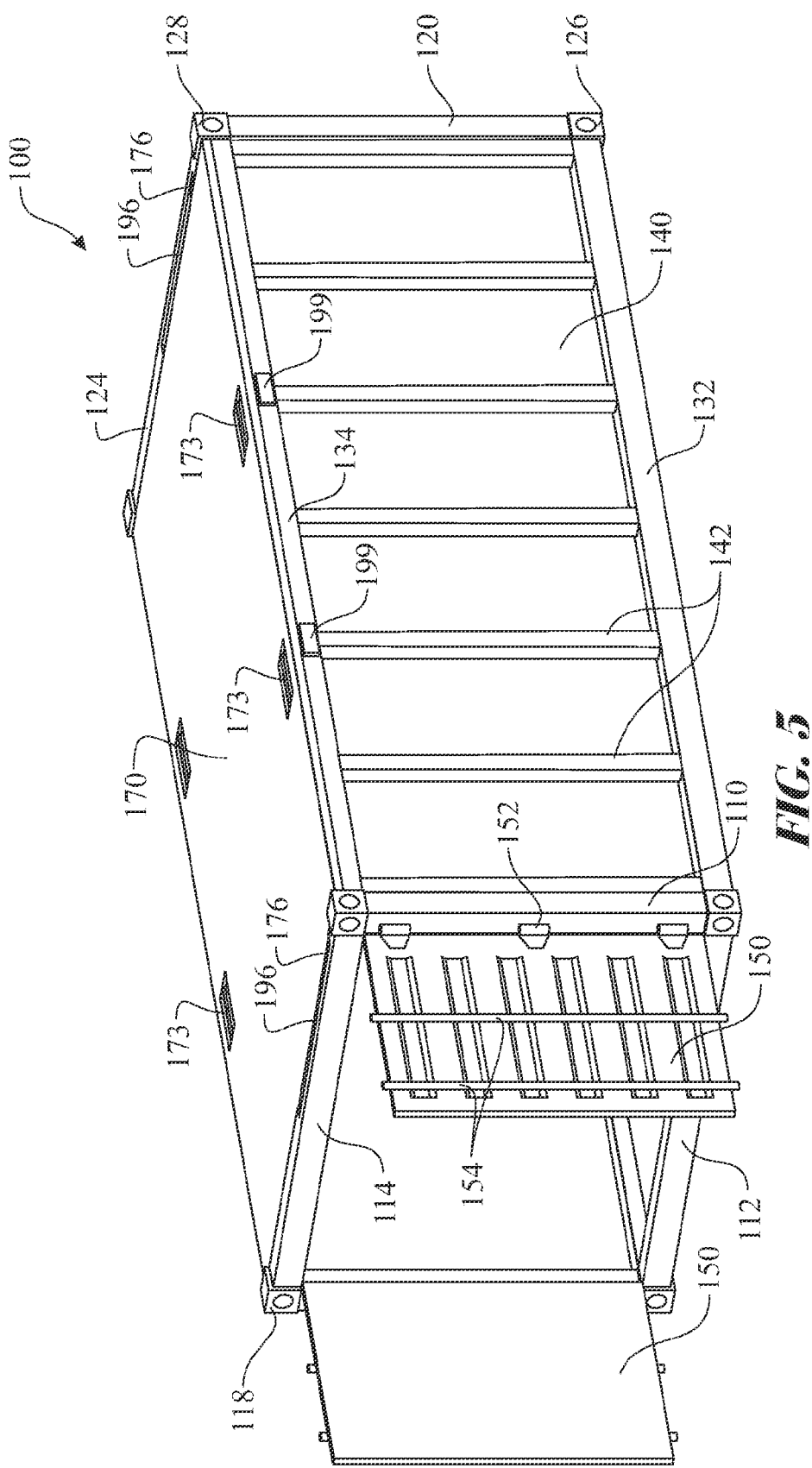
FIG. 5 presents an isometric top view of the intermodal shipping container, wherein a pair of cargo-access doors is illustrated in an opened configuration.
Figure 6:
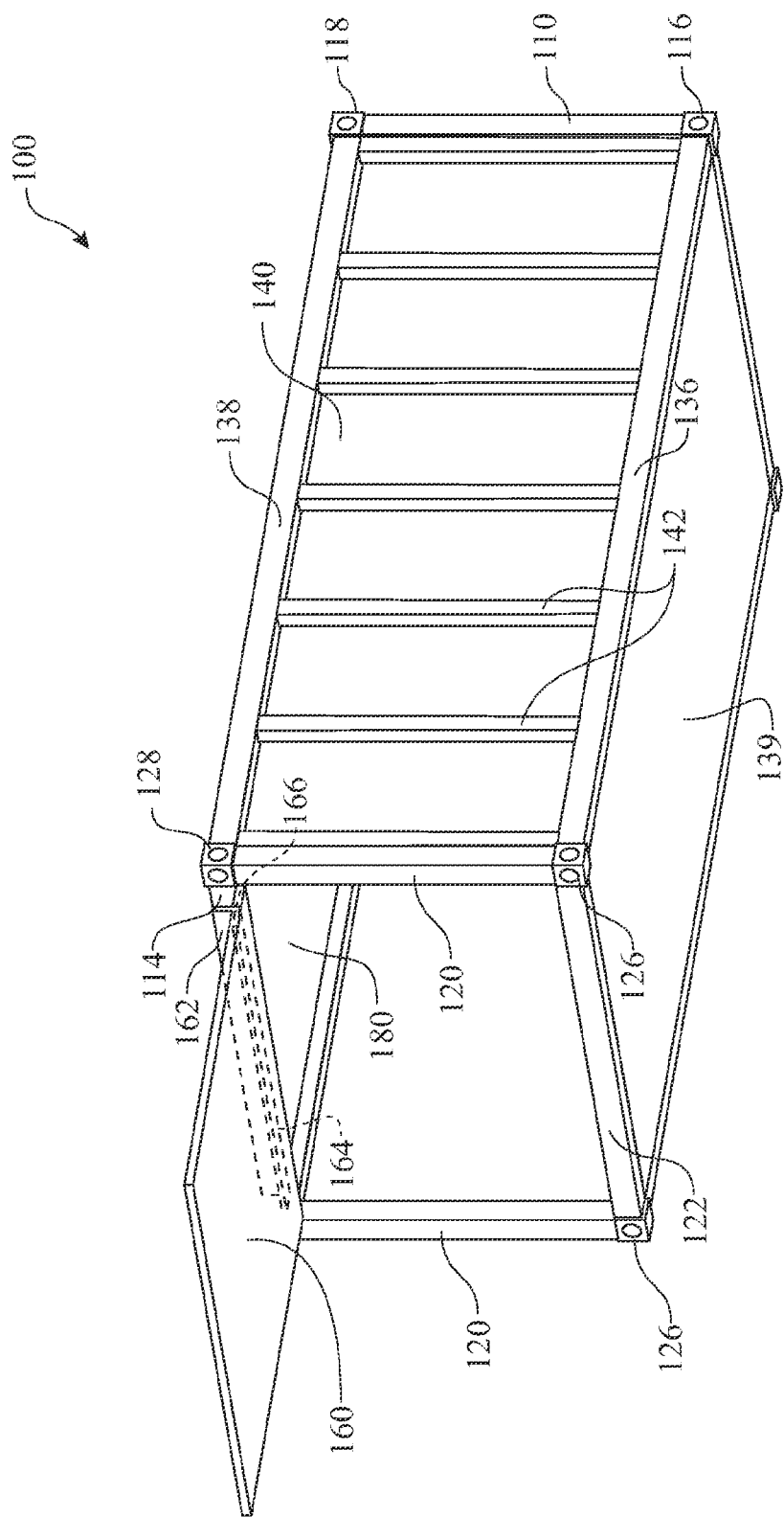
FIG. 6 presents an isometric bottom view of the intermodal shipping container, wherein a dump-gate door is illustrated in an opened configuration.

In some embodiments of the invention horizontal loading and unloading capability is provided by a walk-type cargo door having at least one panel 150 pivotally attached to a rear end of the intermodal container frame 101 (as shown in the double door of FIG. 5). In some embodiments of the invention dump-style unloading capability is provided by a dump gate door having at least one panel 160 pivotally attached to a front end of the intermodal container frame 101 (as shown in FIG. 6). In some embodiments, the intermodal shipping container 100 is configured with both a cargo door and a dump gate door, which provides convenient conversion of an intermodal container for packaged goods into an intermodal container capable of transporting bulk materials. For purposes of description herein, the terms "upper", "lower", "left", "rear", "right", "front", "vertical", "horizontal", and derivatives thereof shall relate to the invention as oriented in FIG. 1.

The intermodal container includes an intermodal container frame 101, a pair of sidewall panels 140, flooring 139, a first end closure on one end of the container frame 101, an opposing end closure on the opposite end of the container frame 101, a roof panel 172 and a roof panel hinge system 180. The first end closure and the second end closure may be a cargo-access walk-type door, a closed end panel, and/or a dump-gate door.

The intermodal container 100 with the top-access roof cover, is designed to adhere to intermodal shipping container standards established by any of various national or international standards organizations. The preferred standardization would be those established by the International Organization for Standardization (ISO). ISO standards for containers were published between 1968 and 1970 by the International Maritime Organization. These standards provide more consistent loading, transporting, and unloading of goods in ports throughout the world, allowing for saved time and resources. These standards define a number of characteristics, including external dimensions of the intermodal shipping container 100, referenced as a length L, a width W, and a height H.

The following presents a portion of the ISO standards for the intermodal shipping container 100:

The intermodal container frame 101 is rectangular shaped in accordance with the ISO standards. The intermodal container frame 101 comprises eight (8) corner fittings 116, 118, 126, 128 wherein the eight (8) corner fittings 116, 118, 126, 128 define the overall dimensions of the intermodal shipping container 100. A corner post 110, 120 was assembled between each bottom corner fitting 116, 126 and each respective top corner fitting 118, 128 defining each vertical segment of the intermodal container frame 101. A bottom cargo-access end frame rail 112 is assembled spanning between each cargo-access end base corner fitting 116 defining a doorsill. A top cargo-access end frame rail 114 is assembled spanning between each cargo-access end top corner fitting 118 defining a door header. Collectively, the pair of cargo-access end corner posts 110, the bottom cargo-access end frame rail 112, the top cargo-access end frame rail 114, the pair of cargo-access end base corner fittings 116 and the pair of cargo-access end top corner fittings 118 define a cargo-access end frame portion 105 of the intermodal container frame 101.

A bottom dump-gate end frame rail 122 is assembled spanning between each dump-gate end base corner fitting 126 providing dump-gate end support for flooring 139. A top dump-gate end frame rail 124 is assembled spanning between each dump-gate end top corner fitting 128 providing dump-gate end support for the roof panel assembly 170. Collectively, the pair of dump-gate end corner posts 120, the bottom dump-gate end frame rail 122, the top dump-gate end frame rail 124, the pair of dump-gate end base corner fittings 126 and the pair of dump-gate end top corner fittings 128 define a dump-gate end frame portion 104 of the intermodal container frame 101.

A bottom curb-side rail 132 is assembled between the curb-side cargo-access end base corner fitting 116 and the respective curb-side dump-gate end base corner fitting 126 providing longitudinal support for the flooring 139. A top curb-side rail 134 is assembled between the curb-side cargo- ISO Intermodal Container Standards

|  |  | 20' Container | | 40' Container | | 40' High-Cube Container | | 45' High-Cube Container | |
| --- | --- | --- | --- | --- | --- | --- | --- | --- | --- |
|  |  | Imperial | Metric | Imperial | Metric | Imperial | Metric | Imperial | Metric |
| External | Length | 19' 10½" | 6.058 m | 40' 0" | 12.192 m | 40' 0" | 12.192 m | 45' 0" | 13.716 m |
| Dimensions | Width | 8' 0" | 2.438 m | 8' 0" | 2.438 m | 8' 0" | 2.438 m | 8' 0" | 2.438 m |
|  | Height | 8' 6" | 2.591 m | 8' 6" | 2.591 m | 9' 6" | 2.896 m | 9' 6" | 2.896 m |
| Interior | Length | 18' 8¹³⁄₁₆" | 5.710 m | 39' 5⁴⁵⁄₆₄" | 12.032 m | 39' 4" | 12.000 m | 44' 4" | 13.556 m |
| Dimensions | Width | 7' 8¹⁹⁄₃₂" | 2.352 m | 7' 8¹⁹⁄₃₂" | 2.352 m | 7' 7" | 2.311 m | 7' 8¹⁹⁄₃₂" | 2.352 m |
|  | Height | 7' 9⁵⁷⁄₆₄" | 2.385 m | 7' 9⁵⁷⁄₆₄" | 2.385 m | 8' 9" | 2.650 m | 8' 9¹⁵⁄₁₆" | 2.698 m |
| Door | Width | 7' 8⅛" | 2.343 m | 7' 8⅛" | 2.343 m | 7' 6" | 2.280 m | 7' 8⅛" | 2.343 m |
| Aperture | Height | 7' 5¾" | 2.280 m | 7' 5¾" | 2.280 m | 8' 5" | 2.560 m | 8' 5⁴⁹⁄₆₄" | 2.585 m |
| Internal Volume |  | 1,169 ft³ | 33.1 m³ | 2,385 ft³ | 67.5 m³ | 2,660 ft³ | 75.3 m³ | 3,040 ft³ | 86.1 m³ |
| Maximum Gross Weight |  | 66,139 lb | 30,400 kg | 66,139 lb | 30,400 kg | 68,008 lb | 30,848 kg | 66,139 lb | 30,400 kg |
| Empty Weight |  | 4,850 lb | 2,200 kg | 8,380 lb | 3,800 kg | 8,598 lb | 3,900 kg | 10,580 lb | 4,800 kg |
| Net Load |  | 61,289 lb | 28,200 kg | 57,759 lb | 26,600 kg | 58,598 lb | 26,580 kg | 55,559 lb | 25,600 kg |

The structural support for the intermodal container 100 is provided by the intermodal container frame 101. The intermodal container frame 101 is detailed in FIG. 1. The sides of the intermodal shipping container 100 can be referenced by the following: an intermodal container cargo-access end 104, an intermodal container dump-gate end 105, an intermodal container curb side 106, an intermodal container road side 107, an intermodal container top 108, and an intermodal container bottom 109.

access end top corner fitting 118 and the respective curb-side dump-gate end top corner fitting 128 providing longitudinal support for the roof panel assembly 170. Collectively, the curb-side cargo-access end corner post 110, 120; the bottom curb-side rail 132; the sidewall panel reinforcing column 142; the curb-side bottom cargo-access end frame rail 112, 122; and the curb-side top cargo-access end frame rail 114, 124 define a curb-side frame portion 106 of the intermodal container frame 101.

A bottom road-side rail 136 is assembled between the road-side cargo-access end base corner fitting 116 and the respective dump-gate end base corner fitting 126 providing longitudinal support for the flooring 139. A top road-side rail 138 is assembled between the road-side cargo-access end top corner fitting 118 and the respective road-side dump-gate end top corner fitting 128 providing longitudinal support for the roof panel assembly 170. Collectively, the road-side cargo-access end corner post 110, 120; the bottom road-side rail 136; the top road-side rail 138; the road-side cargo-access end base corner fitting 116, 126; and the road-side cargo-access end top corner fitting 118, 128 define a road-side frame portion 107 of the intermodal container frame 101.

Collectively, the bottom cargo-access end frame rail 112, the bottom dump-gate end frame rail 122, the bottom curb-side rail 132, and the bottom road-side rail 136 define a flooring frame portion 109 of the intermodal container frame 101. Collectively, the top cargo-access end frame rail 114, the top dump-gate end frame rail 124, the top curb-side rail 134, and the top road-side rail 138 define a roof frame portion 108 of the intermodal container frame 101.

Each of the eight (8) corner fittings 116, 118, 126, 128 comprises a pair of apertures, exemplified by corner fitting interlocks 117, 119, 127, 129. Each corner fitting interlock 117, 119, 127, 129 is horizontally oriented with one corner fitting interlock being parallel to the length L and the second corner fitting interlock being parallel to the width W. The corner fitting interlocks 117, 119, 127, 129 are used to secure the intermodal shipping container 100 to an adjacently located, second intermodal shipping container 100 using a securing pin or similar fastener.

The container is enclosed by assembling paneling to the respective frame portions. Sidewall panels 140 are assembled to the curb-side frame portion 106 and road-side frame portion 107 of the intermodal container frame 101 enclosing each side of the intermodal shipping container 100. The sidewall panels 140 can be supported by incorporating any suitable design, including a corrugated panel formation, integration of a plurality of spatially arranged sidewall panel reinforcing columns 142, and the like. Flooring 139 is assembled to the flooring frame portion 109 of the intermodal container frame 101 enclosing the bottom of the intermodal shipping container 100.

In one aspect door panel 150 is operationally assembled to the cargo-access end frame portion 105 of the intermodal container frame 101 enclosing the cargo-access end of the intermodal shipping container 100 as illustrated in FIG. 5. The preferred configuration includes a pair of cargo door panels 150, each cargo door panel 150 being pivotally attached to a respective cargo-access end corner post 110 by a plurality of spatially arranged cargo door hinges 152. Each of the at least one cargo door panel 150 is retained in a closed configuration by one or more locking bars 154. Each locking bar 154 operates in accordance with known locking bar systems employed by currently available intermodal containers.

In one aspect a dump gate panel 160 is integrated into the intermodal container dump-gate end 105 of the intermodal shipping container 100 as best illustrated in FIG. 6. The dump gate panel 160 is pivotally assembled to the intermodal container frame 101. In the exemplary embodiment, a hinge assembly comprising a dump gate hinge frame attachment beam 162 and a dump gate hinge panel attachment beam 164 pivotally coupled to one another by a dump gate hinge pin 166, rotationally assembles the dump gate panel 160 to the intermodal container frame 101. The dump gate hinge frame attachment beam 162 is secured to the top cargo-access end frame rail 114. An upper edge of the dump gate panel 160 is secured to the dump gate hinge pin 166. The dump gate panel 160 is designed to seal against the intermodal container cargo-access end 104 when rotated into a closed position.

Figure 7:
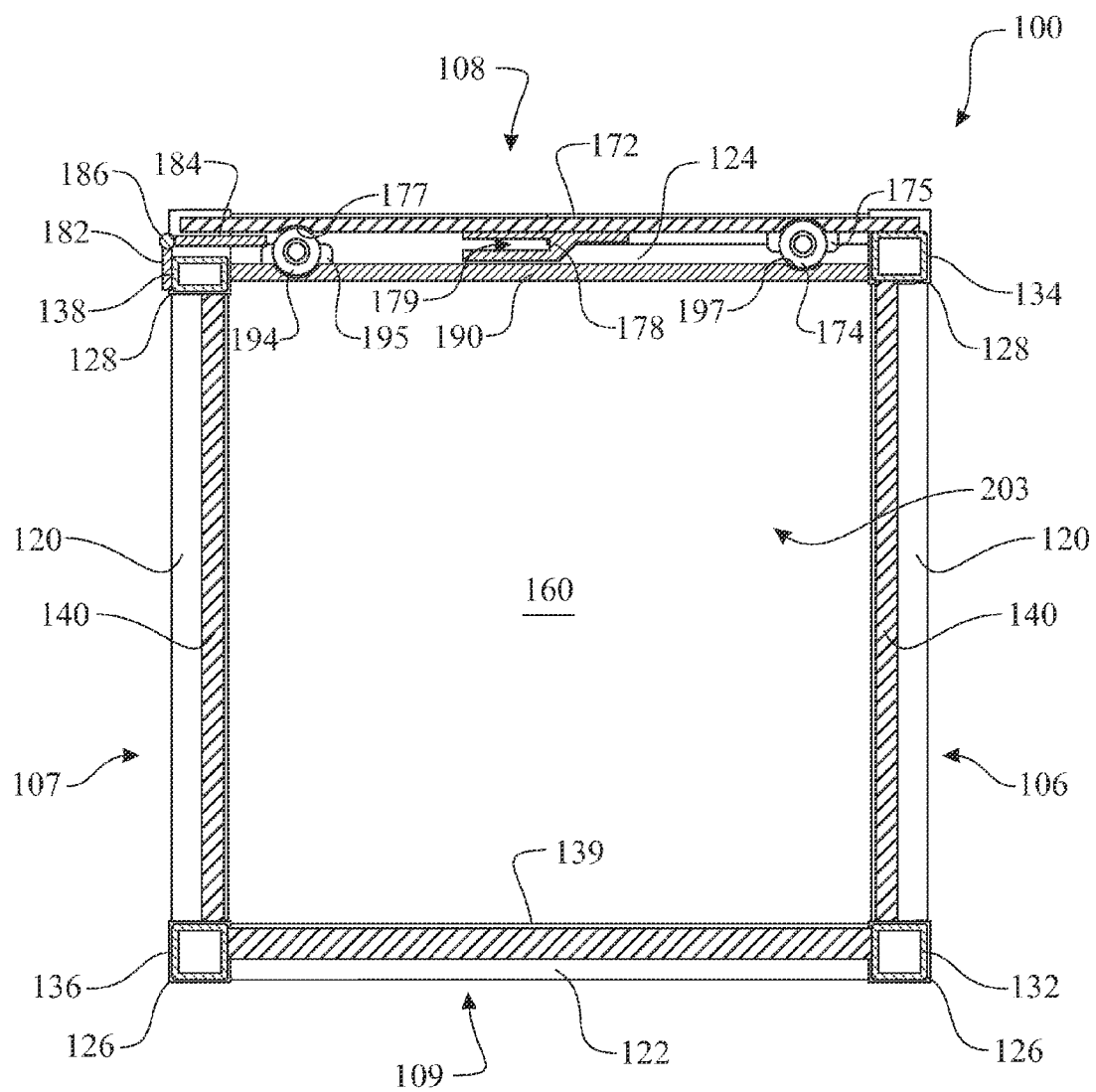
FIG. 7 presents a sectioned end elevation view of the intermodal shipping container detailing an externally located hinge, wherein the shipping container is shown in an enclosed shipping configuration, the section being taken along section line 7-7 of FIG. 2.
Figure 8:
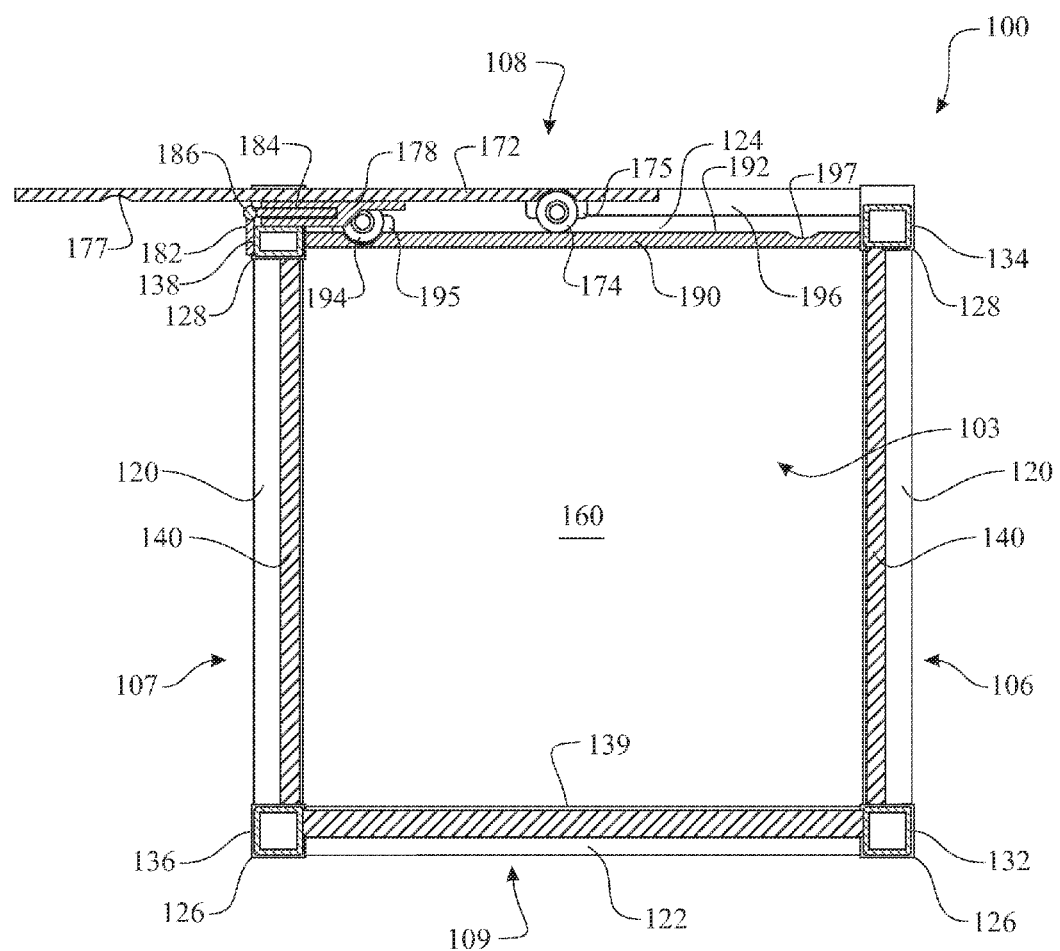
FIG. 8 presents a sectioned end elevation view of the intermodal shipping container of FIG. 7, wherein the roof panel is shown located at a first position of a series of roof panel opening phases, wherein the first position engages a hinge pivotal engagement rail within a roof panel rail-engaging channel.
Figure 9:
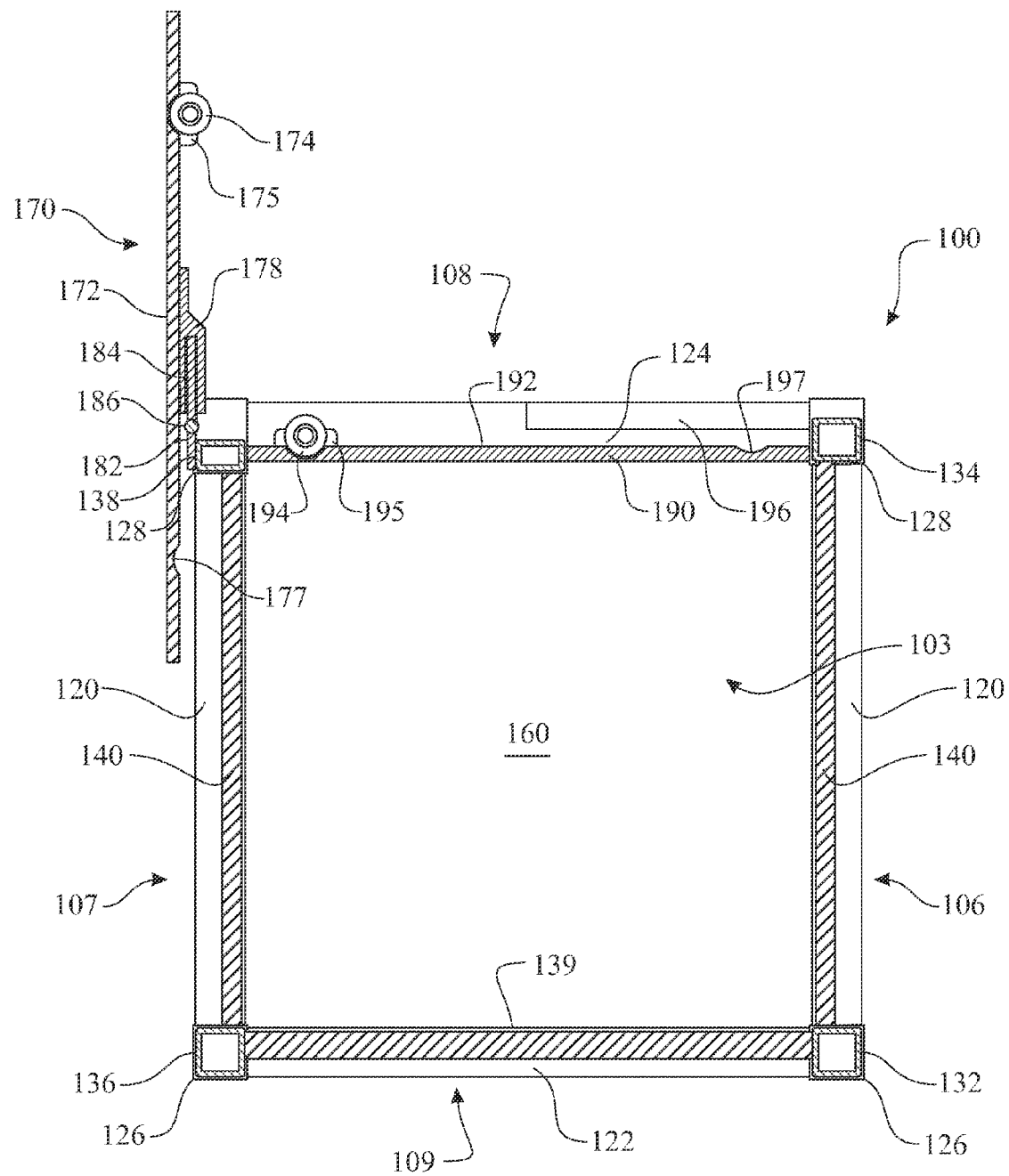
FIG. 9 presents a sectioned end elevation view of the intermodal shipping container of FIG. 7, wherein the roof panel is shown located at a second position of the series of roof panel opening phases, wherein the second position vertically orients the roof panel.

A pivot system is employed to rotate and open the roof panel assembly 170, as best illustrated in FIGS. 7 through 9. The roof panel assembly 170 can include one or more roof panel handling control elements 173 (FIG. 5) to aid in handling and moving the roof panel assembly 170, such as, for example, roof hooks or bars for attachment to standard chain pulley systems. The roof panel handling control elements 173 may extend downwardly slightly or upwardly slightly from the horizontal plane of the roof panel assembly 170, or they may be flush with the horizontal plane of the roof panel assembly 170. The pivot system is integrated into the intermodal shipping container 100 providing a capability for rotating and opening the roof panel assembly 170 in a manner that utilizes the center region of the roof panel assembly 170 to balance the roof panel assembly 170 and minimize the resulting forces, stress, and strain on the pivot system and roof panel assembly 170. The pivot system includes a roof panel hinge-engaging beam 178, which extends downward from an interior surface of a roof panel 172 of the roof panel assembly 170 and is oriented parallel to elongated edges thereof, and a roof panel hinge system 180, which is assembled to an upper member of the intermodal container frame 101. The roof panel hinge system 180 includes a roof panel hinge-attachment rail 182 and a hinge pivotal engagement rail 184 pivotally assembled to one another using a roof panel hinge pivot element 186 or other pivot-enabling element. The roof panel hinge-attachment rail 182 is assembled to an upper portion of the intermodal container frame 101. The hinge pivotal engagement rail 184 is retained in a generally horizontal orientation, directed towards the roof panel hinge-engaging beam 178. The roof panel hinge-engaging beam 178 is shaped to define a roof panel rail-engaging channel 179, wherein an opening providing access to the roof panel rail-engaging channel 179 is oriented facing a roof panel hinge system 180. The roof panel rail-engaging channel 179 is sized to engage and slidably mate with the hinge pivotal engagement rail 184.

A roof panel roller support beam 190 (FIG. 9) is integral with the intermodal container frame 101 along each top-end frame rail 114, 124. Additional roof panel roller support beams 190 can be centrally integrated with the intermodal container frame 101 as illustrated in FIG. 4. The centrally arranged roof panel roller support beams 190 are preferably spatially arranged, extending between the top curb-side rail 134 and the top road-side rail 138. The roof panel assembly 170 is supported by the at least two roof panel roller support beams 190. During a first phase for opening the roof panel assembly 170, the roof panel 172 is slidably positioned along a roller element support surface 192 (FIG. 4) of each roof panel roller support beam 190. This can be accomplished using any suitable sliding interface, including friction, rollers (as illustrated), and the like. The exemplary embodiments employ a series of rolling elements for easing the sliding motion of the roof panel assembly 170 across the upper surface of the intermodal container frame 101 as best illustrated in FIGS. 7 through 9. A plurality of edge roller elements 174 is attached to the underside or interior surface of the roof panel 172 by an attachment member 175. Each roof panel edge roller element 174 is located proximate a distal end of the roof panel 172 and in registration with and to contact a respective roller element support surface 192 of each roof panel roller support beam 190. A roof panel support roller element 194 is attached to each roller element support surface 192 of the roof panel roller support beam 190 by a roof panel support roller element attachment member 195. Each support roller element 194 is located proximate a proximal end of the roof panel roller support beam 190 and preferably in transverse alignment with each respective edge roller element 174. Each support roller element 194 is positioned to contact the underside or interior surface of the roof panel 172 and function in conjunction with the associated support roller element 194. The roller elements 174, 194 can be unidirectional (such as a wheel or a cylinder as shown) or multi-directional (such as a bearing). The roller elements 174, 194 can be recessed within each respective member 172, 190, as illustrated, to reduce the spatial gap extending between the roof panel 172 and the roof panel roller support beam 190.

Rolling elements 174, 194 increase a likelihood of an unwanted sliding motion. The exemplary embodiment introduces a roof panel support roller element chock slot 177 formed in the underside or interior surface of the roof panel 172 and a roof panel roller element chock slot 197 formed in the roller element support surface 192 of the roof panel roller support beam 190. Each roller element chock slot 177, 197 is located in registration with the respective rolling element 195, 175 and sized to retain the wheel in position until the roof panel assembly 170 is subjected to an opening procedure.

The roof panel assembly 170 is retained in longitudinal alignment respective to the intermodal container frame 101 by any of a plurality of optional features. The roof panel 172 can be sized to slidably engage with an interior side surface of each of the top-end frame rails 114, 124 (FIG. 5). A roof panel movement guide element 176 (FIG. 4) can protrude from each edge of the roof panel 172. The movement guide element 176 is designed to slidably engage with a roof panel guide slot 196 (FIGS. 4, 8, 9) formed within each of the top-end frame rails 114, 124. The roof panel guide slot 196 has a length spanning between a distal slot end and a proximal slot end. Each roof panel movement guide element 176 (FIG. 4) approaches and optionally engages with the distal slot end of each respective roof panel guide slot 196 when located in a closed position. Each roof panel movement guide element 176 approaches and preferably engages with the proximal slot end of each respective roof panel guide slot 196 when located in a pivot-engaging position, such as the position illustrated in FIG. 8. The proximal slot end limits a rearward motion of the roof panel assembly 170, ensuring proper seating and alignment of the hinge pivotal engagement rail 184 within the roof panel rail-engaging channel 179.

Although roof panel assembly 170 has been described as a single panel assembly, multiple panel assemblies are within the scope of the term "roof panel assembly." The multiple roof panel assemblies 170 may be longitudinal segments or lateral segments. In the situation in which the roof panel assembly 170 includes multiple lateral segments, the roof panel hinge-engaging beam 178 having the rail engaging channel 179 will also be divided into multiple portions to match the length of the segments of the roof panel assembly 170. For instance, the roof panel assembly 170 may be formed in two segments, each of which can be independently opened. This may be useful when the cargo shipping container has a center interior wall extending laterally across the interior of the cargo shipping container. This allows, for instance, two types of material to be shipped, one on each side of the interior wall. One side of the dual roof panel assembly 170 may be secured in a closed position, while the other side is unlatched and freed to be dumped.

Though a single pivot system has been described above, multiple pivot systems are within the scope of the invention. For example, the roof panel assembly 170 may be formed of two longitudinal sections. Each longitudinal section includes a generally centrally located longitudinal roof panel hinge-engaging beam 178 (with rail engaging channel 179). Each longitudinal side of the cargo shipping container includes a pivot system (hinge pivotal engagement rail 184 and the associated elements). The rail engaging channel 179 of each roof panel hinge-engaging beam 178 of each longitudinal roof panel assembly 170 engages the hinge pivotal engagement rail 184 of its respective side. Therefore, each longitudinal segment of the roof panel assembly 170 may be opened independently. The dual longitudinal roof panel assembly 170 causes each segment to be approximately half the weight of the full roof panel and provides a benefit in manual opening operations.

Additionally, the hinge pivotal engagement rail 184 and the roof panel hinge-engaging beam 178 (which defines the rail engaging channel 179) have been described as extending substantially the entire longitudinal length of the cargo shipping container. However, the hinge pivotal engagement rail 184 with its associated elements and the roof panel hinge-engaging beam 178 with its associated elements may be formed of multiple portions, either when the roof panel assembly 170 is formed as a single panel or as multiple panels. This may be desirable to meet the needs of particular shipping containers. For instance, if there is a center support beam within the cargo shipping container, it may be preferably to have the roof panel hinge-engaging beam 178 and associated elements separated into two portions with a center opening left to accommodate the central support beam, even when the roof panel assembly 170 is formed as a single panel.

The following describes the operation of the intermodal shipping container 100. Initially, the roof panel assembly 170 is positioned in a closed configuration, as illustrated in FIG. 7. The rolling elements 174, 194 are seated in the respective roller element chock slots 177, 197, retaining the roof panel assembly 170 in position. The roof panel assembly 170 may additionally be secured in location by one or more roof panel assembly securing systems, such as a roof panel locking system 199 (FIGS. 4 and 5). The roof panel assembly securing system can be any suitable latching and/or locking system.

In an initial step of a roof panel opening process, a force is sufficiently applied to the roof panel assembly 170 to drive the rolling elements 174, 194 out from the respective roller element chock slots 177, 197 engaging the roof panel edge roller element 174 with the roller element support surface 192 and the roof panel support roller element 194 with the underside or interior surface of the roof panel 172. The roof panel assembly 170 is driven towards the roof panel hinge system 180 transferring the roof panel assembly 170 from the position as illustrated in FIG. 7 to the position as illustrated in FIG. 8. The hinge pivotal engagement rail 184 is retained in alignment with the roof panel rail-engaging channel 179 by any suitable support element (now shown), such as a bracket carried by the intermodal container frame 101, a supporting flange carried by any component of the intermodal container frame 101 (such as the roof panel roller support beam 190), a slide channel attached to the underside of the roof panel 172, and the like. The hinge pivotal engagement rail 184 is slidably inserted into the rail engaging channel 179 of the roof panel hinge-engaging beam 178 during the sliding motion of the roof panel assembly 170 until the distal edge of the pivotal engaging rail 184 abuts the seating or base surface of the rail-engaging channel 179. Once the pivotal engaging rail 184 of the roof panel hinge is properly seated within the rail-engaging channel 179, the process transitions from a sliding motion into a rotational motion. The roof panel assembly 170 rotates about a pivot axis defined by the longitudinal axis of the pivot element 186 of the hinge, as illustrated in FIG. 9. The roof panel assembly 170 can be retained in a vertical, opened positioned by any suitable feature (not shown), including strapping, springs, counterweights, struts, support bars, and the like. Once the roof panel assembly 170 is opened, bulk cargo is deposited into the container interior volume 103 of the intermodal shipping container 100 through the top opening. Bulk cargo can include coal, agricultural products, bauxite, iron, raw mined materials, ready-mix concrete, aggregates, rock, stone, dirt, wood, and the like. Upon filling the container interior volume 103, the roof panel assembly 170 is returned to a closed configuration by reversing the roof panel opening process.

Figure 10:
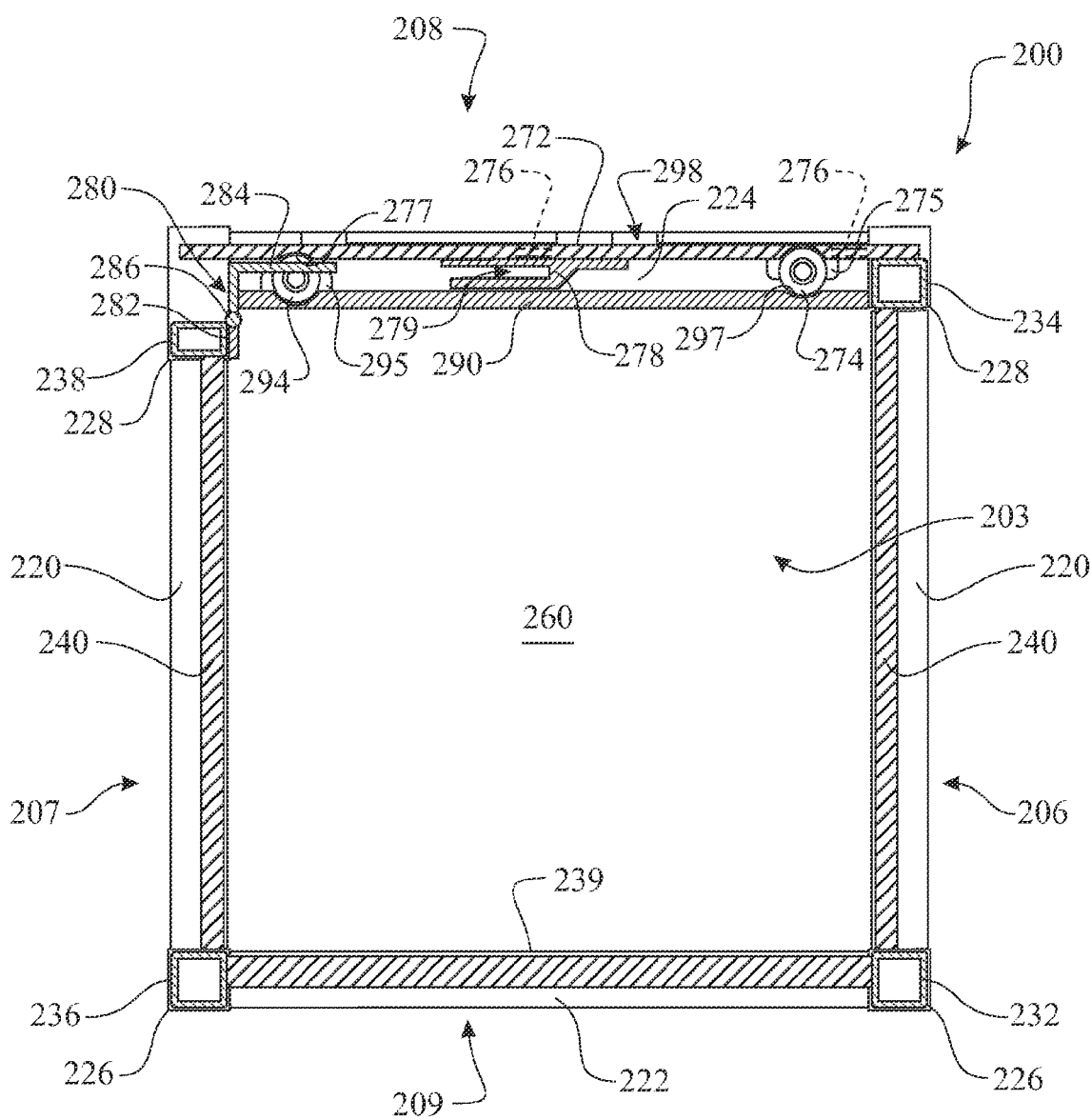
FIG. 10 presents a sectioned end elevation view of the intermodal shipping container detailing an embodiment comprising an internally located hinge, wherein the shipping container is shown in an enclosed shipping configuration, the section being taken along a section similar to the section line 7-7 of FIG. 2.
Figure 11:
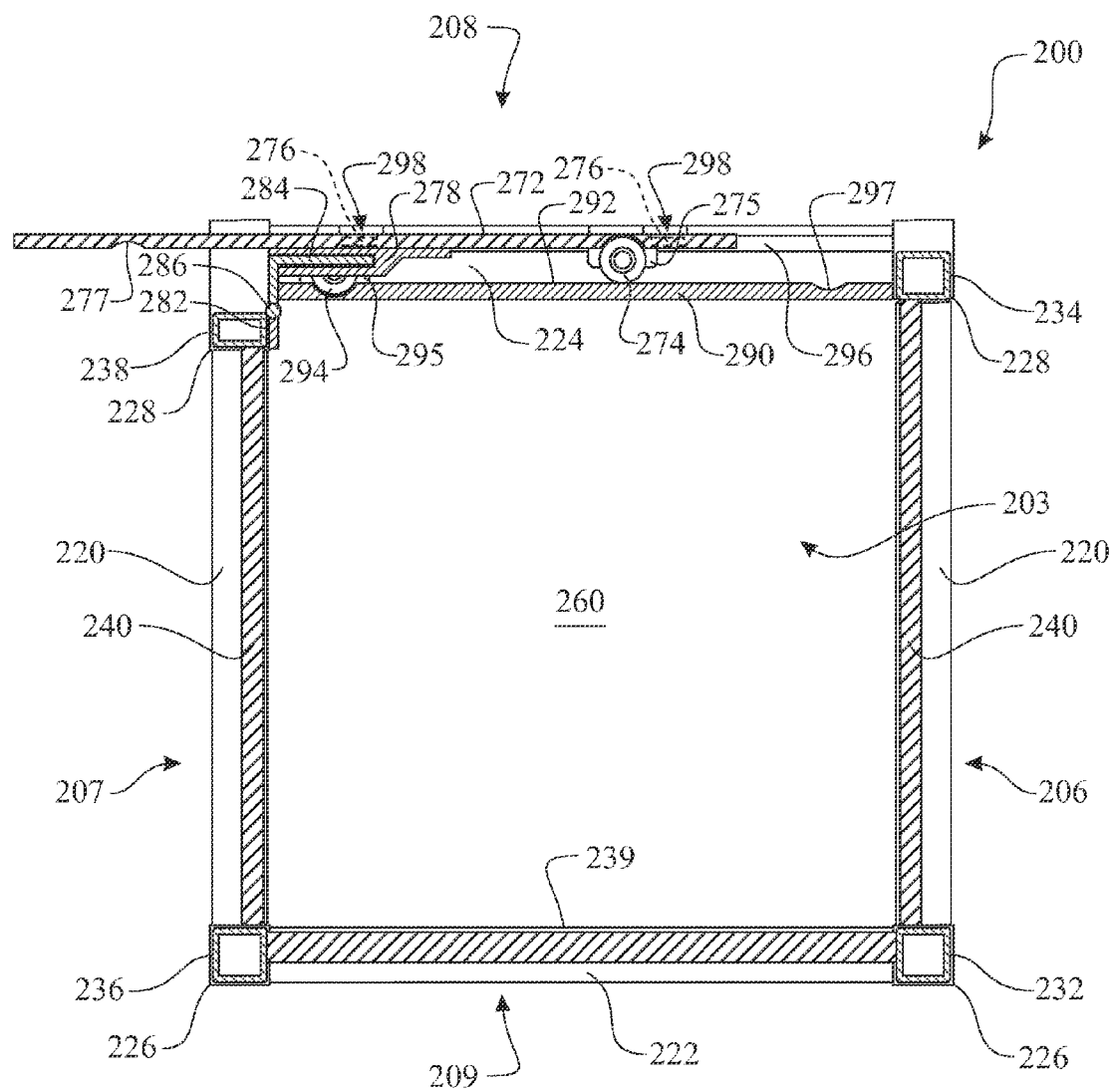
FIG. 11 presents a sectioned end elevation view of the intermodal shipping container of FIG. 10, wherein the roof panel is shown located at a first position of a series of roof panel opening phases, wherein the first position engages a hinge pivotal engagement rail within a roof panel rail-engaging channel.
Figure 12:
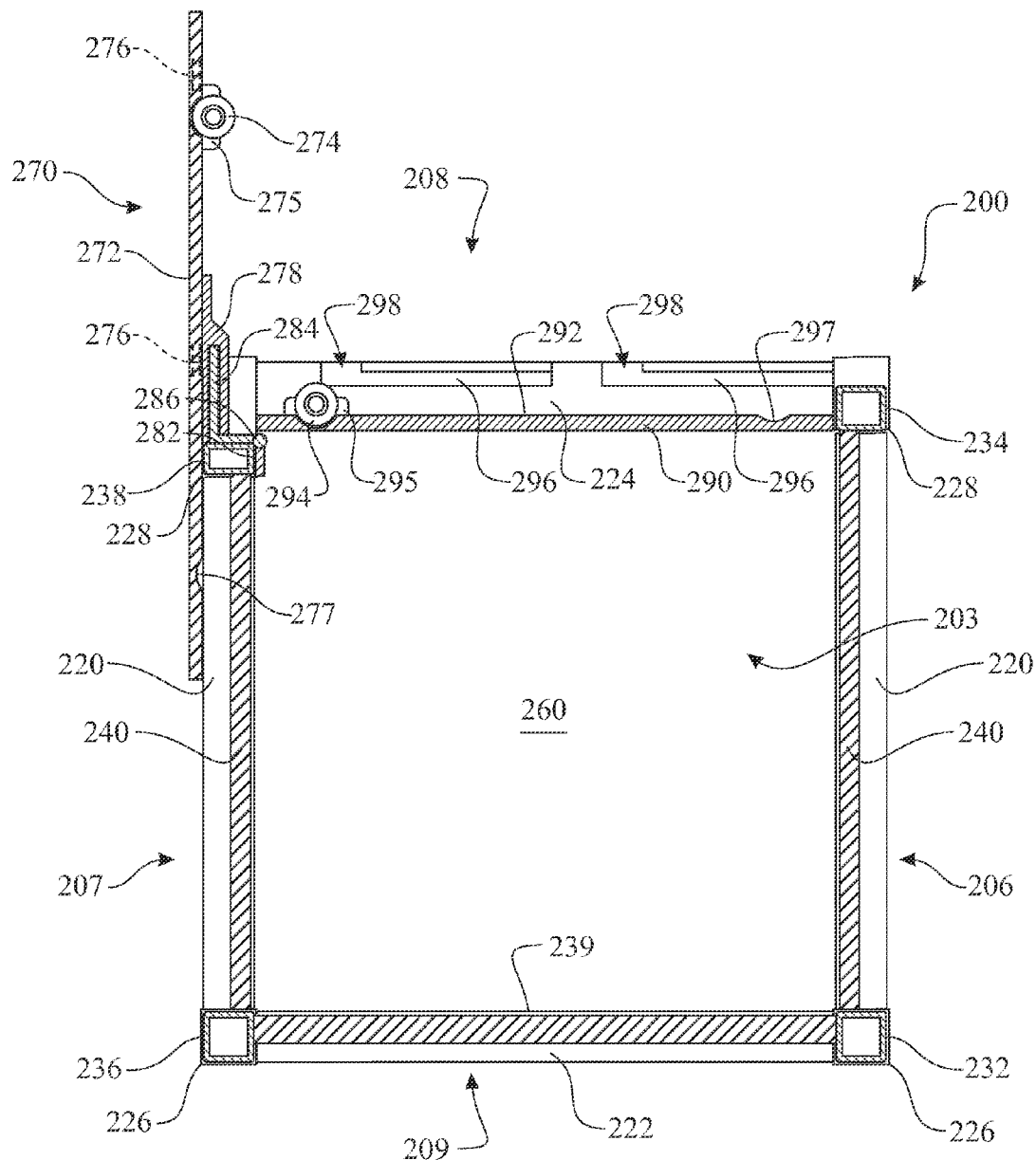
FIG. 12 presents a sectioned end elevation view of the intermodal shipping container of FIG. 10, wherein the roof panel is shown located at a second position of the series of roof panel opening phases, wherein the second position vertically orients the roof panel.

The intermodal shipping container 100 is representative of an embodiment locating the roof panel hinge system 180 on the exterior of the intermodal container frame 101. The intermodal shipping container 100 can be modified by locating the roof panel hinge system 280 on an interior thereof, as illustrated in an embodiment referred to as an intermodal shipping container 200, which is illustrated in FIGS. 10 through 12. The intermodal shipping container 100 and the intermodal shipping container 200 include a majority of like elements, wherein like elements of the intermodal shipping container 200 and the intermodal shipping container 100 are numbered the same except preceded by the numeral "2."

The roof panel hinge system 280 includes a roof panel hinge-attachment rail 282 and a hinge pivotal engagement rail 284 pivotally assembled to one another using a roof panel hinge pivot element 286 or other pivot-enabling element. The attachment rail 282 is assembled to an interior surface of an upper portion of the intermodal container frame 201 in a manner and configuration to locate the roof panel hinge pin 286 within a container interior volume 203 thereof. The pivotal engaging rail 284 includes a vertical segment and a horizontal segment (when oriented in a closed position). The rail-engaging channel 279 of the roof panel hinge-engaging beam 278 is defined by an upper beam and a lower beam. A distal end of the lower arm of the engaging beam 278 is designed to seat against the mating surface of the pivotal engaging rail 284. A distal end of the upper beam of the engaging beam 278 is designed to seat against the mating or upper surface of the top road-side rail 238 when the roof panel assembly 270 is rotated into an upright or opened position. The engagement between engaging beam 278 and the combination of the pivotal engaging rail 284 and top road-side rail 238 provides support for the roof panel assembly 270 when the roof panel assembly 270 is placed in the open configuration.

The intermodal shipping container 200 additionally introduces a modified version of the roof panel guide slot 196, where a roof panel guide slot 296 is formed as a channel extending between an upper flange and a lower or sliding flange. The roof panel guide slot 296 is accessed by way of a roof panel guide slot access 298 (FIG. 12). The exemplary intermodal shipping container 200 includes a pair of roof panel guide slots 296 formed within each top-end frame rail 224 or similarly suitable element. The exemplary roof panel assembly 270 includes a pair of movement guide elements 276 extending outward from each transverse side of the roof panel 272. Each roof panel movement guide element 276 is located to pass through an associated roof panel guide slot access 298 as the roof panel 272 rotates between a closed and an opened configuration. During operation, each movement guide element 276 passes through the guide slot access 298 during a rotational motion of the roof panel 272. Each movement guide element 276 slides within each guide slot 296. Once the movement guide element 276 is positioned within the guide slot 296, the upper flange retains the guide element 276, which subsequently retains the roof panel 272 from any vertical motion. Grease or other suitable lubricant can be applied to each roof panel movement guide element 276 and/or each roof panel guide slot 296 to aid in the sliding motion. Alternatively, a rolling element, such as a wheel, can replace each roof panel movement guide element 276. The rolling elements can be used either in conjunction with or replacement of each of the roof panel edge roller elements 274 and the roof panel support roller elements 294. The placement of the movement guide element 276 may be varied but remains in alignment with the roof panel guide slot access 298. Optionally, each of the pair of movement guide elements 276 may include two movement guide elements 276, a distal and proximal movement guide element 276, and each of the pair of roof panel guide slots 296 (accessed by way of roof panel guide slot accesses 298) may include two roof panel guide slots 296 (a distal and a proximal roof guide slot 296), as illustrated in FIG. 12. Optionally, an additional guide slot access 298 can be located at the distal end of the guide slot 296.

Figure 13:
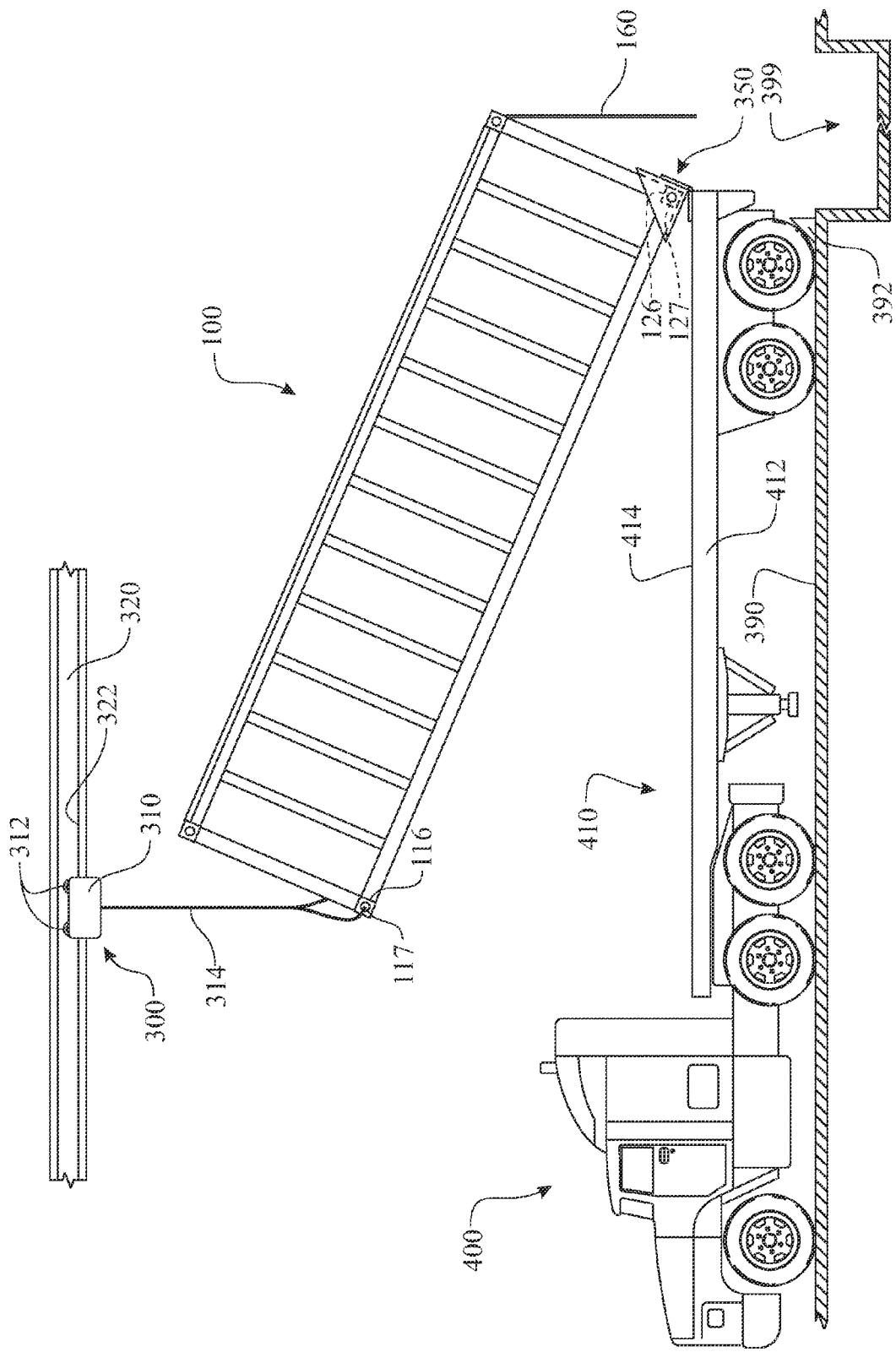
FIG. 13 presents a side elevation view of a roadway transport vehicle, wherein the illustration presents the intermodal shipping container dumping bulk contents through the dump gate.
Figure 14:
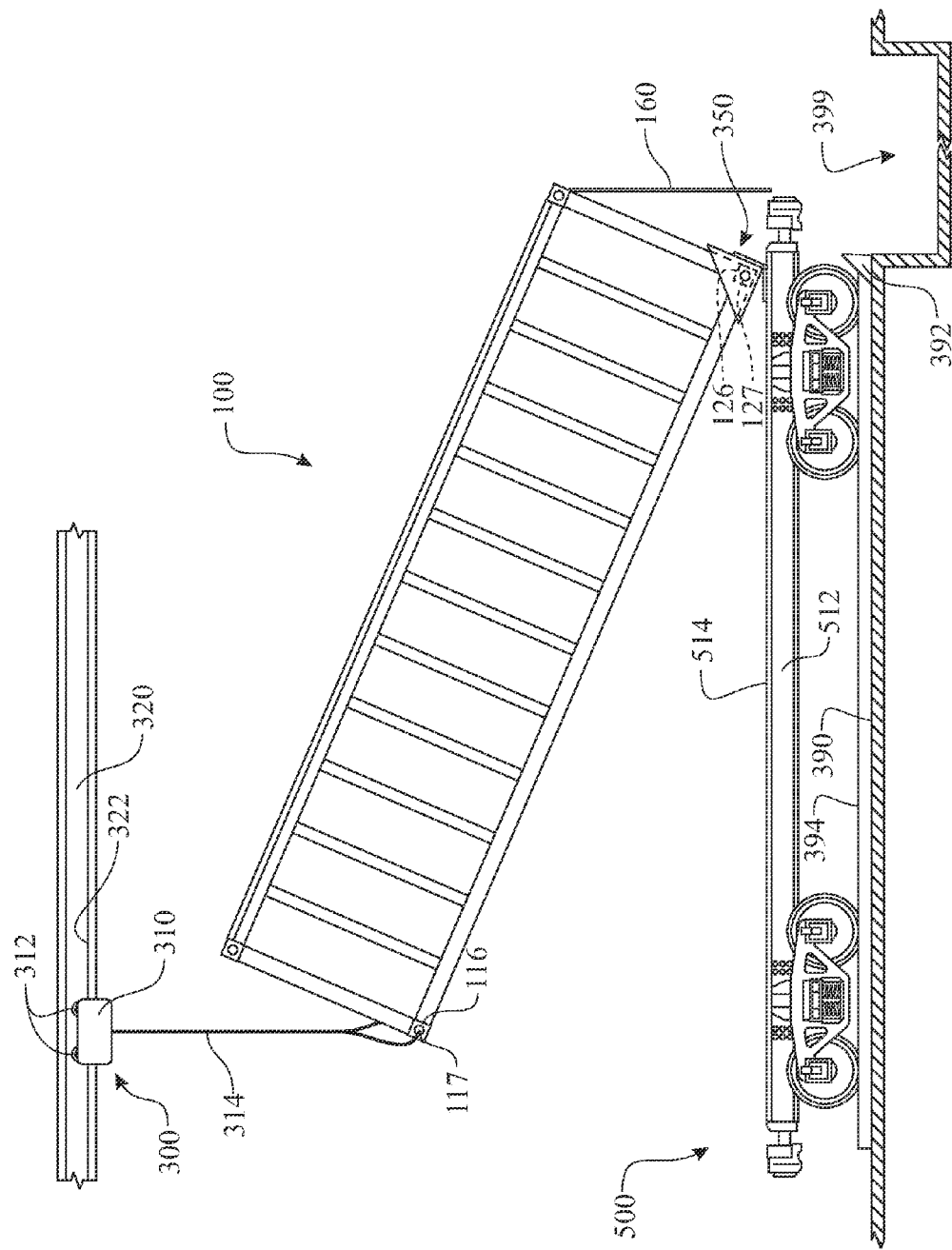
FIG. 14 presents a side elevation view of a railway transport vehicle, wherein the illustration presents the intermodal shipping container dumping bulk contents through the dump gate.

The loading process can be accomplished while the intermodal shipping container 100, 200 is placed on the ground or upon a transport vehicle. The transport vehicle can include a tractor-trailer 400, 410, as introduced in the illustration shown in FIG. 13, a railcar 500 as introduced in the illustration shown in FIG. 14, a roll off transport truck, and the like. The transport vehicle can include a dump control hinge assembly 350 to aid in delivery of the bulk cargo placed within the container interior volume 103, 203.

The first exemplary transport vehicle, the tractor-trailer 400, 410, comprises a transport semi-trailer 410 being towed by a transport tractor 400. The transport semi-trailer 410 includes a trailer cargo support frame 412. The trailer cargo support frame 412 defines a trailer cargo support surface 414 for receiving and supporting the intermodal shipping container 100, 200 during transport. The dump control hinge assembly 350 can be affixed to the trailer cargo support frame 412 at a location proximate a trailing end thereof.

Figure 15:
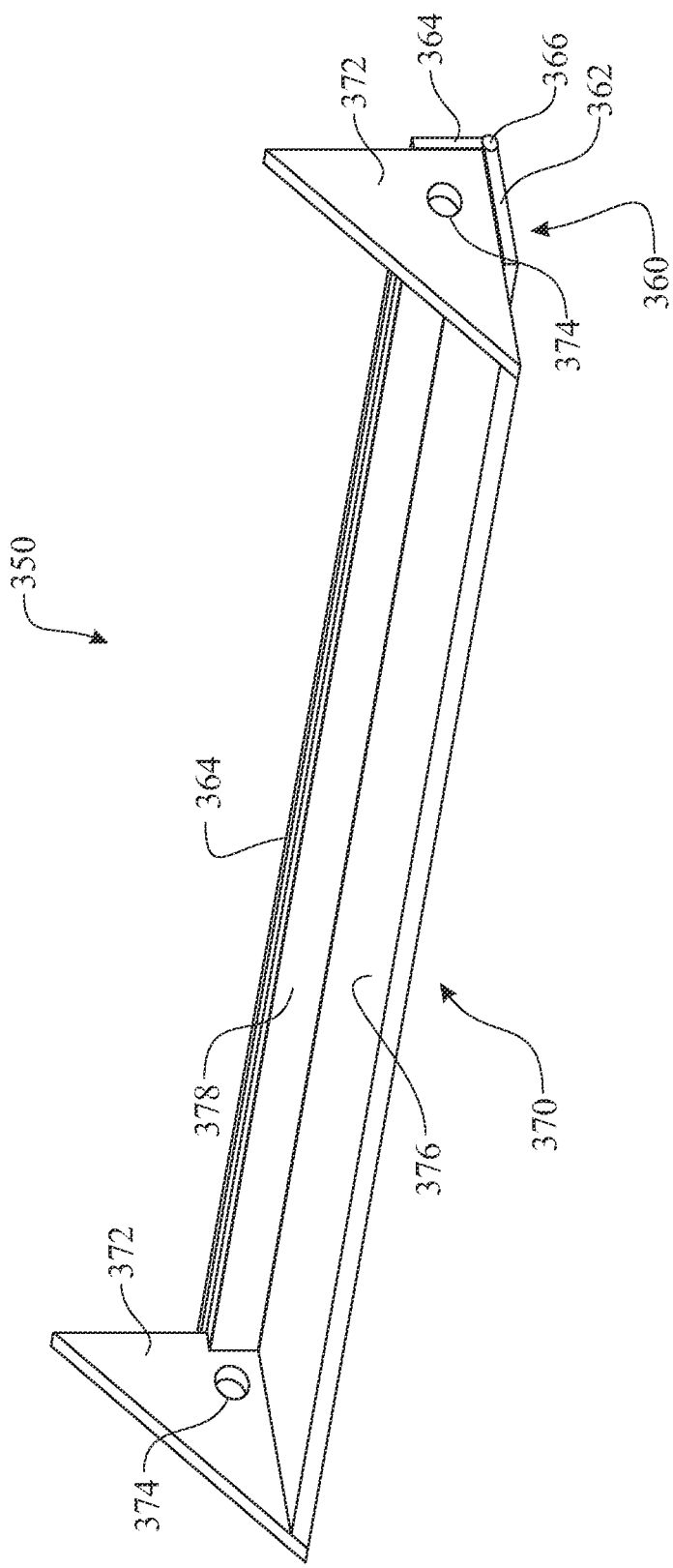
FIG. 15 presents a top isometric view detailing a dump control hinge assembly for use with the transport platform of a transport vehicle, wherein the dump control hinge assembly is shown in a transport orientation.
Figure 16:
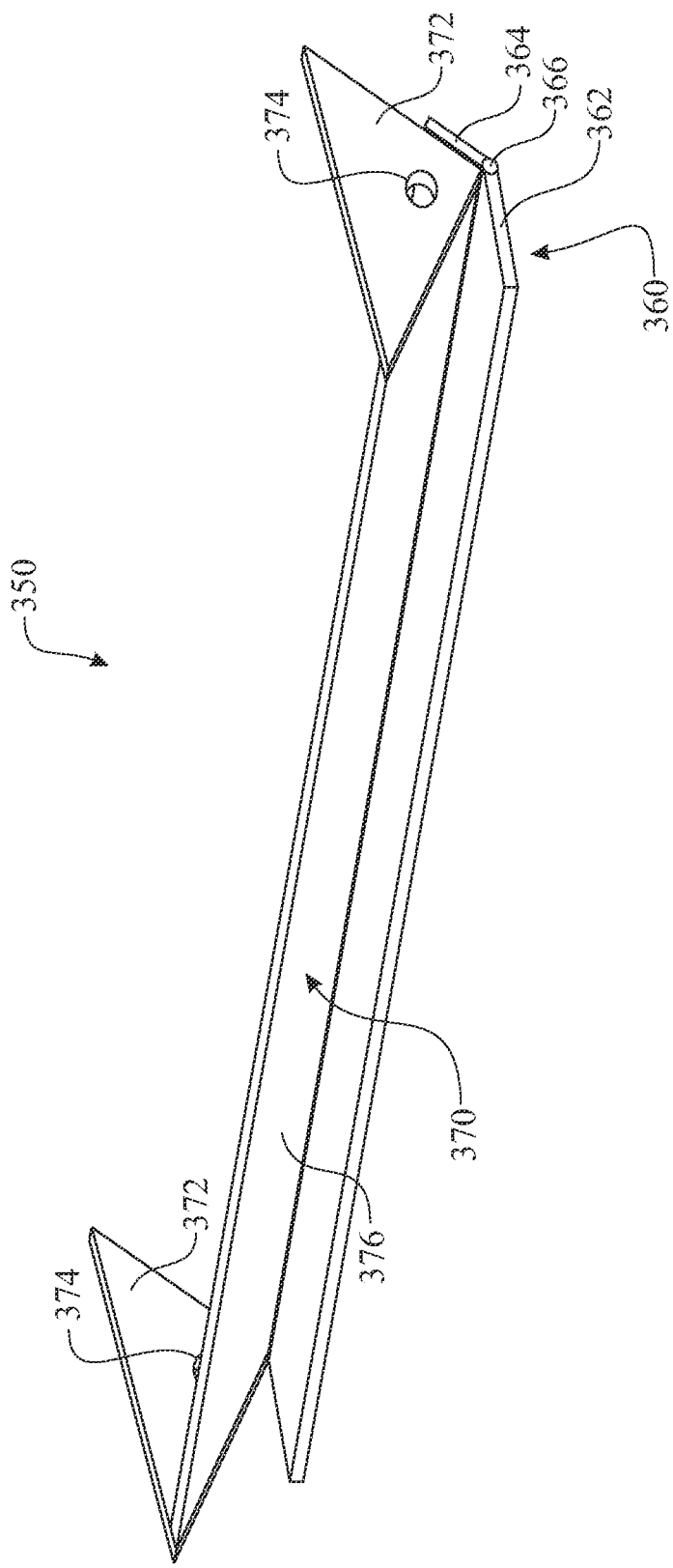
FIG. 16 presents a top isometric view illustrating the dump control hinge assembly detailed in FIG. 15, wherein the dump control hinge assembly is shown in a delivery orientation.

The dump control hinge assembly 350 is detailed in FIGS. 15 and 16. The dump control hinge assembly 350 includes a dump control container seat assembly 370 assembled to a dump control hinge 360. The dump control hinge 360 includes a dump control hinge transporter attachment beam 362 and a dump control hinge container seat attachment beam 364 pivotally assembled to one another using a dump control hinge pin 366 or any other suitable pivot-enabling element. The dump control hinge transporter attachment beam 362 is assembled to the trailer cargo support frame 412 utilizing any structurally capable assembly method. Similarly, the dump control container seat assembly 370 is assembled to the dump control hinge container seat attachment beam 364 utilizing any structurally capable assembly method. The dump control container seat assembly 370 is designed to include features that adapt to and affix to a dump-gate end of the intermodal shipping container 100, 200. The exemplary dump control container seat assembly 370 includes a dump control container seat base plate 376 and a dump control container seat end plate 378 joined to one another forming a generally right angle. The dump control container seat end plate 378 is sized to abut an exterior surface of the bottom dump-gate end frame rail 122, 222, but limited in height to avoid interference with operation of the dump gate panel 160, 260. A dump control container seat side plate 372 is assembled to each longitudinal end of the dump control container seat base plate 376 and dump control container seat end plate 378. The dump control container seat side plate 372 enhances structural integrity between the dump control container seat base plate 376 and the dump control container seat end plate 378 and can be of any suitable shape. An end plate interlock aperture 374 is formed through the dump control container seat side plate 372 at a location in alignment with each respective dump-gate end base corner fitting interlock 127 of the intermodal shipping container 100. Once the intermodal shipping container 100 is placed upon the trailer cargo support surface 414 and seated within the dump control container seat assembly 370, a retention pin (not shown) is inserted through the 374 and the associated dump-gate end base corner fitting interlock 127.

The exemplary tractor 400 and trailer 410 are supported by a transporter supporting surface 390 and driven to a delivery area. The exemplary tractor 400 and trailer 410 would be similar to commonly available tractor 400 and trailers 410 available for current transportation of intermodal containers. The trailer 410 would be modified by assembling a dump control hinge assembly 350 to the transport trailer 410 at a proper location. The tractor 400 and trailer 410 are backed into a bulk material receiving ditch 399 (FIG. 13) of the delivery area. An optional transporter dump locating chock 392 can be located upon the transporter supporting surface 390 to aid the driver to properly position the trailer 410, placing the dumping end of the intermodal shipping container 100 to target dumping of the bulk cargo into a bulk material receiving ditch 399.

During a dumping delivery process, a forward end of the intermodal shipping container 100 is raised by any suitable mechanism. In the exemplary embodiment, a hoist assembly 300 is utilized to raise the forward end of the intermodal shipping container 100. A hoist lifting element 314 is secured through each cargo-access end base corner fitting interlock 117 and collected by a hoist 310. A hoist support beam 320 or any other structurally suitable support supports the hoist 310. The hoist 310 can be secured to the hoist support beam 320 using a fixed attachment system, such as a bracket, mechanical fasteners, threaded fasteners, a chain, cabling, and the like or a moveable attachment system, such as hoist travel roller elements 312 (as shown), a slide channel, and the like. The moveable attachment system can utilize a hoist roller element support surface 322 of an "I" shaped or inverted "T" shaped beam hoist support beam 320 enabling horizontal transport of the hoist 310. As the hoist 310 raises the forward end of the intermodal shipping container 100, the dump control hinge assembly 350 retains the dumping end of the intermodal shipping container 100 pivotally assembled to the rear end of the transport semi-trailer 410. The dump gate panel 160 is opened either simply resulting from the natural plum weight of the dump gate panel 160, using any known suitable mechanical opening mechanism, using any known suitable hydraulic opening mechanism, manually opening the dump gate panel 160, and the like. The hoist 310 can continue to slowly raise the forward end of the intermodal shipping container 100 until all of the bulk cargo has been transferred from the container interior volume 103 to the bulk material receiving ditch 399. Once all of the bulk cargo has been transferred from the container interior volume 103 to the bulk material receiving ditch 399, the hoist 310 lowers the forward end of the intermodal shipping container 100 until the intermodal shipping container 100 is returned to the trailer cargo support surface 414. The forward end of the intermodal shipping container 100 can be re-secured in position. The dump gate panel 160 can be secured in a closed position. Once inspected, the transport vehicle would leave the delivery location. It is understood that any of a variety of bulk material transport systems can be employed to aid in transferring the bulk cargo from the bulk material receiving ditch 399 to a final destination. The bulk material transport systems can include a conveyor belt, rail carts, and the like.

A second exemplary transport vehicle is a railcar 500. The railcar 500 travels on a railway track 394 supported by the transporter supporting surface 390. The railcar 500 includes a railcar cargo support frame 512 supported by railway wheels carried by a suspension system. The intermodal shipping container 100 is placed upon and carried by a railcar cargo support surface 514 of the railcar cargo support frame 512. The transporter dump locating chock 392 would be located at a position proximate an end of the railway track 394 where the wheels would be stopped by the transporter dump locating chock 392, thus properly positioning the railcar 500 for delivery of the bulk cargo from the intermodal shipping container 100 into the bulk material receiving ditch 399. The process for delivering the bulk cargo from the container interior volume 103 of the intermodal shipping container 100 would be the same as the process described when using the trailer 410 for transporting the intermodal shipping container 100.

The transport vehicle can be of any suitable form factor. The lifting mechanism employed for raising or lifting the forward end of the intermodal shipping container 100 can be any suitable mechanism, including a system that is integrated into the transport vehicle or separate from the transport vehicle.

The intermodal shipping container 100, 200 would preferably be designed to meet the dimensional standards defined for any intermodal container, however the novel top-access roof can also be utilized as a part of other similarly constructed non-standardized shipping containers.

The detailed embodiments of the present invention disclosed herein are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The above detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, brief summary or detailed description. It is also to be understood that the specific devices and processes illustrated in the attached drawings, and described in the specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A cargo shipping container comprising:
    a shipping container frame defining a generally rectangular shape comprising:
        a first end frame comprising a pair of first end corner posts, wherein each of said pair of first end corner posts has a top portion and a bottom portion; a first top-end frame rail extending between said top portions of each of said pair of first end corner posts; and a first bottom-end frame rail extending between said bottom portions of each of said pair of first end corner posts;
        a second end frame comprising a pair of second end corner posts, wherein each of said pair of second end corner posts has a top portion and a bottom portion; a second top-end frame rail extending between said top portions of each of said pair of second end corner posts; and a second bottom-end frame rail extending between said bottom portions of each of said pair of second end corner posts;
        a first upper side rail extending between said top portion of a first one of said pair of first end corner posts and said top portion of a respective first one of said pair of second end corner posts;
        a second upper side rail extending between said top portion of a second one of said pair of first end corner posts and said top portion of a respective second one of said pair of second end corner posts;
        a first bottom side rail extending between said bottom portion of a first one of said pair of first end corner posts and said bottom portion of a respective first one of said pair of second end corner posts; and
        a second bottom side rail extending between said bottom portion of a second one of said pair of first end corner posts and said bottom portion of a respective second one of said pair of second end corner posts;
    a pair of sidewall panels, a first one of said pair of sidewall panels extending between said first upper side rail and the respective said first bottom side rail, and a second one of said pair of sidewall panels extending between said second upper side rail and the respective said second bottom side rail;
    flooring extending between said first bottom side rail and said second bottom side rail;
    a first end closure operationally assembled to said first end frame comprising one of: a first dump-gate door, a first cargo-access door and a first end panel;
    a second end closure operationally assembled to said second end frame comprising one of: a second dump-gate door, a second cargo-access door and a second end panel;
    a roof panel;
    a roof panel pivot system, said roof panel pivot system comprising:
        a roof panel hinge system including a roof panel hinge-attachment rail attached to an upper element of said shipping container frame, a hinge pivotal engagement rail, and a roof panel hinge pivot element pivotally assembling said roof panel hinge-attachment rail and said hinge pivotal engagement rail with one another; and
        a roof panel hinge-engaging beam defining a roof panel rail-engaging channel sized and oriented for receiving and engaging with said hinge pivotal engagement rail, said roof panel hinge-engaging beam being carried by an interior surface of said roof panel; and
    a plurality of rolling elements, each rolling element being rotationally assembled to one of an interior surface of said roof panel and a roof panel roller support beam of said shipping container frame in a manner to provide a rolling interface between said roof panel and said roof panel roller support beam;
    wherein said pair of sidewall panels, said flooring, said first end closure, said second end closure, and said roof panel define a container interior volume, wherein said container interior volume is at least accessible through said roof panel; and
    wherein, in operation, said roof panel is moved linearly to a position where said hinge pivotal engagement rail is inserted into said roof panel rail-engaging channel, then said roof panel pivots in accordance with a rotational motion provided by said roof panel hinge pivot element.

2. The cargo shipping container as recited in claim 1, said shipping container further comprising a plurality of wheel roller element chock slots, each roller element chock slot being formed in a surface of one of said roof panel and an associated rolling element supporting surface of said shipping container frame to retain an associated rolling element of said plurality of rolling elements therein when said roof panel is positioned in a closed configuration.

3. The cargo shipping container as recited in claim 1, wherein said first end closure comprises a first dump-gate door and said second end closure comprises a second cargo-access door.

4. The cargo shipping container as recited in claim 1, wherein said first end closure comprises a first dump-gate door and said second end closure comprises a second end panel.

5. The cargo shipping container as recited in claim 1, wherein said first end closure comprises a first end panel and said second end closure comprises a second end panel.

6. The cargo shipping container as recited in claim 1, wherein said first end closure comprises a first dump-gate door and said second end closure comprises a second dump-gate door.

7. The cargo shipping container as recited in claim 1, wherein said cargo shipping container comprises an ISO-compliant intermodal shipping container.

8. The cargo shipping container as recited in claim 1, wherein said roof panel hinge-attachment rail is attached to the interior of said shipping container frame.

9. The cargo shipping container as recited in claim 1, wherein said roof panel hinge-attachment rail is attached to the exterior of said shipping container frame.

10. A cargo shipping container comprising:
a shipping container frame defining a generally rectangular shape comprising:
   a first end frame comprising a pair of first end corner posts, wherein each of said pair of first end corner posts has a top portion and a bottom portion; a first top-end frame rail extending between said top portions of each of said pair of first end corner posts; and a first bottom-end frame rail extending between said bottom portions of each of said pair of first end corner posts;
   a second end frame comprising a pair of second end corner posts, wherein each of said pair of second end corner posts has a top portion and a bottom portion; a second top-end frame rail extending between said top portions of each of said pair of second end corner posts; and a second bottom-end frame rail extending between said bottom portions of each of said pair of second end corner posts;
   a first upper side rail extending between said top portion of a first one of said pair of first end corner posts and said top portion of a respective first one of said pair of second end corner posts;
   a second upper side rail extending between said top portion of a second one of said pair of first end corner posts and said top portion of a respective second one of said pair of second end corner posts;
   a first bottom side rail extending between said bottom portion of a first one of said pair of first end corner posts and said bottom portion of a respective first one of said pair of second end corner posts;
   a second bottom side rail extending between said bottom portion of a second one of said pair of first end corner posts and said bottom portion of a respective second one of said pair of second end corner posts;
a pair of sidewall panels, a first one of said pair of sidewall panels extending between said first upper side rail and the respective said first bottom side rail, and a second one of said pair of sidewall panels extending between said second upper side rail and the respective said second bottom side rail;
flooring extending between said first bottom side rail and said second bottom side rail;
a first end closure operationally assembled to said first end frame comprising one of: a first dump-gate door, a first cargo-access door and a first end panel;
a second end closure operationally assembled to said second end frame comprising one of: a second dump-gate door, a second cargo-access door and a second end panel;
a roof panel;
a roof panel pivot system, said roof panel pivot system comprising:
   a roof panel hinge system including a roof panel hinge-attachment rail attached to an upper element of said shipping container frame, a hinge pivotal engagement rail, and a roof panel hinge pivot element pivotally assembling said roof panel hinge-attachment rail and said hinge pivotal engagement rail with one another; and
   a roof panel hinge-engaging beam defining a roof panel rail-engaging channel sized and oriented for receiving and engaging with said hinge pivotal engagement rail, said roof panel hinge-engaging beam being carried by an interior surface of said roof panel; and
a plurality of rolling elements, a portion of said rolling elements being rotationally assembled to an interior surface of said roof panel and a second portion of said rolling elements being rotationally assembled to a roof panel roller support beam of said shipping container frame in a manner to provide a rolling interface between said roof panel and said roof panel roller support beam;
wherein said pair of sidewall panels, said flooring, said first end closure, said second end closure, and said roof panel define a container interior volume, wherein said container interior volume is at least accessible through said roof panel; and
wherein, in operation, said roof panel is moved linearly to a position where said hinge pivotal engagement rail is inserted into said roof panel rail-engaging channel, then said roof panel pivots in accordance with a rotational motion provided by said roof panel hinge pivot element.

11. A cargo shipping container comprising:
a shipping container frame defining a generally rectangular shape comprising:
   a first end frame comprising a pair of first end corner posts, wherein each of said pair of first end corner posts has a top portion and a bottom portion; a first top-end frame rail extending between said top portions of each of said pair of first end corner posts; and a first bottom-end frame rail extending between said bottom portions of each of said pair of first end corner posts;
   a second end frame comprising a pair of second end corner posts, wherein each of said pair of second end corner posts has a top portion and a bottom portion; a second top-end frame rail extending between said top portions of each of said pair of second end corner posts; and a second bottom-end frame rail extending between said bottom portions of each of said pair of second end corner posts;
   a first upper side rail extending between said top portion of a first one of said pair of first end corner posts and said top portion of a respective first one of said pair of second end corner posts;
   a second upper side rail extending between said top portion of a second one of said pair of first end corner posts and said top portion of a respective second one of said pair of second end corner posts;
   a first bottom side rail extending between said bottom portion of a first one of said pair of first end corner posts and said bottom portion of a respective first one of said pair of second end corner posts;
   a second bottom side rail extending between said bottom portion of a second one of said pair of first end corner posts and said bottom portion of a respective second one of said pair of second end corner posts;
a pair of sidewall panels, a first one of said pair of sidewall panels extending between said first upper side rail and the respective said first bottom side rail, and a second one of said pair of sidewall panels extending between said second upper side rail and the respective said second bottom side rail;

flooring extending between said first bottom side rail and said second bottom side rail;
a first end closure operationally assembled to said first end frame comprising one of: a first dump-gate door, a first cargo-access door and a first end panel;
a second end closure operationally assembled to said second end frame comprising one of: a second dump-gate door, a second cargo-access door and a second end panel;
a roof panel;
a roof panel pivot system, said roof panel pivot system comprising:
　a roof panel hinge system including a roof panel hinge-attachment rail attached to an upper element of said shipping container frame, a hinge pivotal engagement rail, and a roof panel hinge pivot element pivotally assembling said roof panel hinge-attachment rail and said hinge pivotal engagement rail with one another;
　a roof panel hinge-engaging beam defining a roof panel rail-engaging channel sized and oriented for receiving and engaging with said hinge pivotal engagement rail, said roof panel hinge-engaging beam being carried by an interior surface of said roof panel;
a roof panel guide slot formed within a member located adjacent to a transverse edge of said roof panel; and
a roof panel movement guide element extending outward from said transverse edge of said roof panel;
wherein said roof panel movement guide element moves within said roof panel guide slot during said linear motion of said roof panel;
wherein said pair of sidewall panels, said flooring, said first end closure, said second end closure, and said roof panel define a container interior volume, wherein said container interior volume is at least accessible through said roof panel; and
wherein, in operation, said roof panel is moved linearly to a position where said hinge pivotal engagement rail is inserted into said roof panel rail-engaging channel, then said roof panel pivots in accordance with a rotational motion provided by said roof panel hinge pivot element.

12. The cargo shipping container as recited in claim 11, said roof panel guide slot further comprises a lower flange and an upper flange, wherein said roof panel movement guide element slides between said flanges.

13. An intermodal shipping container comprising:
an intermodal container frame defining a generally rectangular shape, said intermodal container frame comprising:
　a first end frame including a pair of first end corner posts, each first end corner post having a top portion and a bottom portion; a first top-end frame rail extending between said top portions of each of said pair of first end corner posts; and a first bottom-end frame rail extending between said bottom portions of each of said pair of first end corner posts;
　a second end frame including a pair of second end corner posts, each second end corner post having a top portion and a bottom portion, a second top-end frame rail extending between said top portions of each of said pair of second end corner posts, and a second bottom-end frame rail extending between said bottom portions of each of said second end corner posts;
　a first upper side rail extending between said top portion of a first one of said pair of first end corner posts and said top portion of a respective first one of said pair of second end corner posts;
　a second upper side rail extending between said top portion of a second one of said pair of first end corner posts and said top portion of a respective second one of said pair of second end corner posts;
　a first bottom side rail extending between said bottom portion of said first one of said pair of first end corner posts and said bottom portion of a respective first one of said pair of second end corner posts; and
　a second bottom side rail extending between said bottom portion of said second one of said pair of first end corner posts and said bottom portion of a respective second one of said second end corner posts;
a first sidewall panel extending between said first upper side rail and said first bottom side rail;
a second sidewall panel extending between said second upper side rail and said second bottom side rail;
flooring extending between said first bottom side rail and said second bottom side rail;
a dump-gate door having an upper edge pivotally attached to one of said first end frame and said second end frame;
at least one cargo-access door, each of said at least one cargo-access door having a side edge pivotally attached to one of said first end frame and said second end frame;
a roof panel; and
a roof panel pivot system, said roof panel pivot system comprising:
　a roof panel hinge system including a roof panel hinge-attachment rail attached to an interior upper portion of said intermodal container frame, a hinge pivotal engagement rail, and a roof panel hinge pivot element pivotally assembling said roof panel hinge-attachment rail and said hinge pivotal engagement rail with one another; and
　a roof panel hinge-engaging beam defining a roof panel rail-engaging channel sized and oriented for receiving and engaging with said hinge pivotal engagement rail, said roof panel hinge-engaging beam being carried by an interior surface of said roof panel;
a plurality of rolling elements, each rolling element being rotationally assembled to one of an interior surface of said roof panel and a roof panel roller support beam of said intermodal container frame in a manner to provide a rolling interface between said roof panel and said roof panel roller support beam; and
a plurality of wheel roller element chock slots, each roller element chock slot being formed in a surface of one of said roof panel and an associated rolling element supporting surface of said intermodal container frame to retain an associated rolling element of said plurality of rolling elements therein when said roof panel is positioned in a closed configuration;
wherein said pair of sidewall panels, said flooring, said at least one cargo-access door, said dump-gate door, and said roof panel define a container interior volume, wherein said container interior volume is accessible through said pivotally attached roof panel and said at least one cargo-access door and said dump-gate door; and
wherein, in operation, said roof panel is moved linearly to a position where said hinge pivotal engagement rail is inserted into said roof panel rail-engaging channel, then said roof panel pivots in accordance with a rotational motion provided by said roof panel hinge pivot element.

14. The intermodal container as recited in claim 13, wherein said roof panel hinge-attachment rail is attached to the interior of said intermodal container frame.

15. The intermodal container as recited in claim 13, wherein said roof panel hinge-attachment rail is attached to the exterior of said intermodal container frame.

* * * * *